United States Patent
Kumar et al.

(10) Patent No.: US 12,526,109 B2
(45) Date of Patent: Jan. 13, 2026

(54) METHOD TO IMPROVE DOWNLINK PRS POSITIONING PERFORMANCE IN PRESENCE OF SLOT MISALIGNMENT

(71) Applicant: QUALCOMM Incorporated, San Diego, CA (US)

(72) Inventors: Mukesh Kumar, Hyderabad (IN); Guttorm Ringstad Opshaug, Redwood City, CA (US); Siddhant, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 469 days.

(21) Appl. No.: 18/005,950

(22) PCT Filed: Apr. 7, 2021

(86) PCT No.: PCT/US2021/026245
§ 371 (c)(1),
(2) Date: Jan. 18, 2023

(87) PCT Pub. No.: WO2022/071989
PCT Pub. Date: Apr. 7, 2022

(65) Prior Publication Data
US 2023/0269048 A1    Aug. 24, 2023

(30) Foreign Application Priority Data

Sep. 30, 2020 (IN) .............................. 202041042506

(51) Int. Cl.
*H04L 5/00* (2006.01)
*G01S 5/02* (2010.01)
(Continued)

(52) U.S. Cl.
CPC .......... *H04L 5/0051* (2013.01); *G01S 5/0236* (2013.01); *G01S 5/14* (2013.01); *H04W 64/00* (2013.01)

(58) Field of Classification Search
CPC ................ H04L 5/0051; H04L 5/0007; H04L 5/0048; H04L 27/2613; G01S 5/0236; G01S 5/14;
(Continued)

(56) References Cited

U.S. PATENT DOCUMENTS

| 2015/0296359 | A1* | 10/2015 | Edge ..................... G01S 1/0428 455/404.2 |
| 2018/0070209 | A1* | 3/2018 | Jain ........................ H04W 24/08 |
| 2020/0228381 | A1 | 7/2020 | Manolakos et al. |

OTHER PUBLICATIONS

Catt: "DL Reference Signals for NR Positioning", 3GPP TSG RAN WG1 #97, R1-1906305, V1.0 Final, 3RD Generation Partnership Project, Mobile Competence Centre, 650, Route Des Lucioles, F-06921 Sophia-Antipolis Cede, vol. RAN WG1, No. Reno, USA, May 13, 2019-May 17, 2019 May 13, 2019, XP051727755, pp. 1-17.

(Continued)

*Primary Examiner* — Vinncelas Louis
(74) *Attorney, Agent, or Firm* — Weaver Austing Villenueve & Sampson LLP

(57) ABSTRACT

A method of user equipment (UE) positioning includes receiving positioning assistance data associated with a Transmission Reception Point (TRP), such as an expected Reference Signal Time difference (RSTD) between a reference cell and the TRP. The method also includes capturing, based on at least the expected RSTD, a first portion of reference signals from the TRP, where, at the UE, the first portion of the reference signals does not overlap in time with non-reference signals from the reference cell. The method further includes determining a first Time of Arrival (TOA) of the reference signals from the TRP based on the first portion of the reference signals.

30 Claims, 19 Drawing Sheets

(51) Int. Cl.
*G01S 5/14* (2006.01)
*H04W 64/00* (2009.01)

(58) Field of Classification Search
CPC ........ G01S 5/0063; G01S 5/0215; G01S 5/10; G01S 5/0018; G01S 5/0045; G01S 1/0428; H04W 64/00; H04W 24/08; H04B 17/254
See application file for complete search history.

(56) References Cited

OTHER PUBLICATIONS

Huawei: "DL and UL Reference Signals for NR Positioning", 3GPP Draft; 3GPP TSG RAN WG1 Meeting #96bis, R1-1904004, 3rd Generation Partnership Project (3GPP), Mobile Competence Centre; 650, Route Des Lucioles; F-06921 Sophia-Antipolis Cedex; France, vol. RAN WG1, No. Xi'an, China; Apr. 8, 2019-Apr. 12, 2019, Apr. 2, 2019 (Apr. 2, 2019), XP051707080, 13 Pages, The whole document, Section 1, paragraph [02.3]—paragraph [02.4], p. 3.

Huawei, et al., "Physical Layer Procedure for NR Positioning", 3GPP Draft, 3GPP TSG RAN WG1 Meeting #96b, R1-1904006, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 2, 2019 (Apr. 2, 2019), XP051707082, 11 Pages, paragraph [3.1.3]—paragraph [03.4], figure 3, table 1, sections 3.1.3, 3.3.

International Search Report and Written Opinion—PCT/US2021/026245—ISA/EPO—Jun. 15, 2021.

Huawei et al., "Physical Layer Procedure for NR Positioning", R1-1904006, 3GPP TSG RAN WG1 Meeting #96b, Xi'an, China, Apr. 8, 12, 2019, 10 Pages, Section 3.1.3.

Qualcomm Incorporated: "DL Reference Signals for NR Positioning", R1-1909278, 3GPP TSG RAN WG1 #98, Prague, Czech Republic, 26th Aug. 30, 2019, pp. 1-20, Sections 1, 3-4.

* cited by examiner

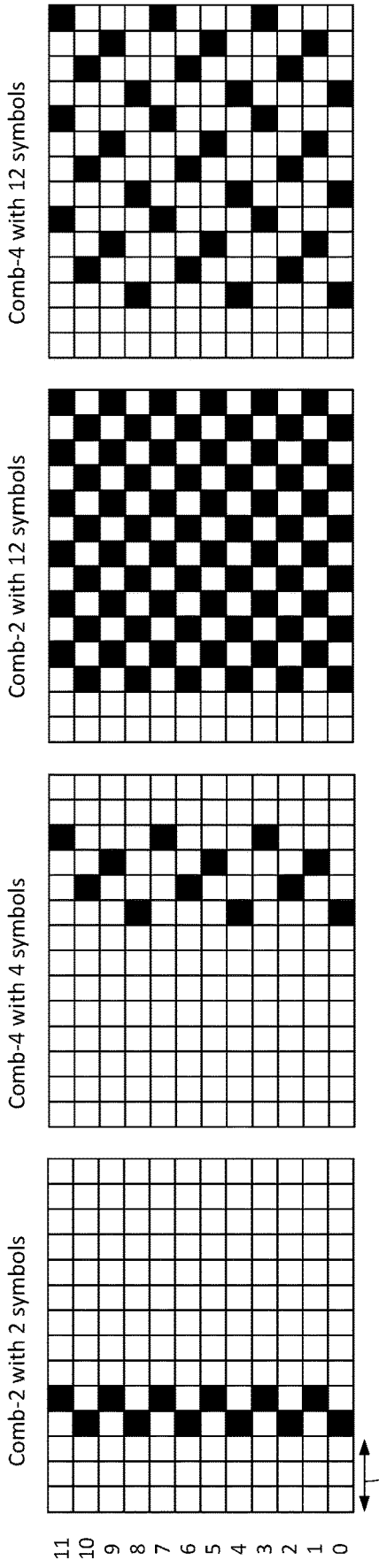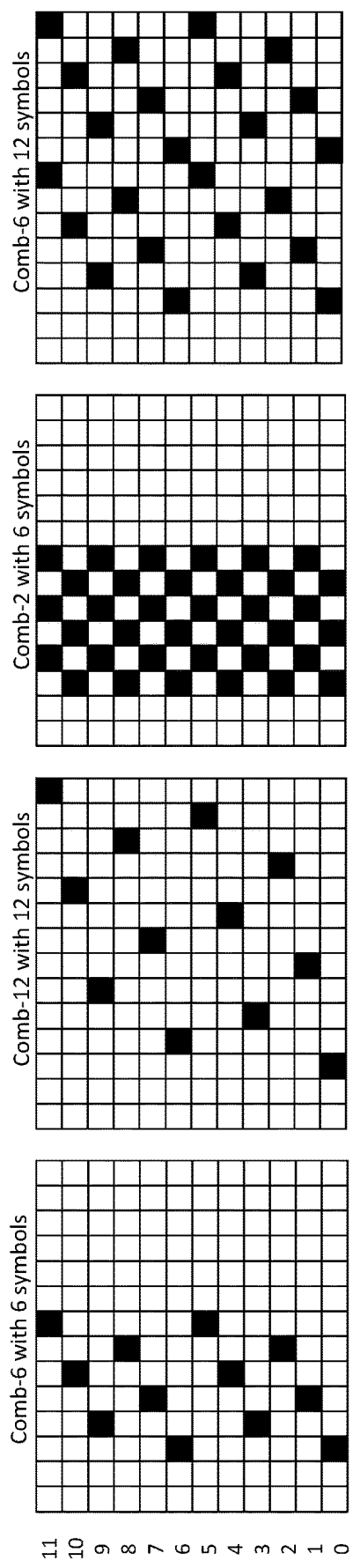
FIG. 7A  FIG. 7B  FIG. 7C  FIG. 7D
FIG. 7E  FIG. 7F  FIG. 7G  FIG. 7H

METHOD TO IMPROVE DOWNLINK PRS POSITIONING PERFORMANCE IN PRESENCE OF SLOT MISALIGNMENT

RELATED APPLICATIONS

This application is a U.S. National Phase Application of International Patent Application No. PCT/US2021/026245, filed Apr. 7, 2021, entitled "METHOD TO IMPROVE DOWNLINK PRS POSITIONING PERFORMANCE IN PRESENCE OF SLOT MISALIGNMENT," which claims the benefit of Indian patent application Ser. No. 202041042506, filed Sep. 30, 2020, entitled "METHOD TO IMPROVE DOWNLINK PRS POSITIONING PERFORMANCE IN PRESENCE OF SLOT MISALIGNMENT," both of which are assigned to the assignee hereof, and incorporated by reference.

BACKGROUND

1. Field of Invention

This disclosure relates generally to wireless communications, and more specifically, to determining the location of a user equipment (UE) using radio frequency (RF) wireless communication signals.

2. Description of Related Art

For many years, UE positioning has generally been accomplished using global navigation satellite systems (GNSS) assisted by cellular networks. This approach can provide accurate positioning but is often limited to outdoor areas having satellite visibility. There are a range of applications that may need accurate positioning outdoors and/or indoors. In both long-term evolution (LTE) wireless networks and fifth generation (5G) new radio (NR) wireless networks, network nodes (e.g., base stations or reference UEs) may transmit reference signals that can be measured by a UE to determine the location of the UE, using a variety of network-based positioning methods. For example, in both LTE and 5G NR wireless networks, positioning reference signals (PRS) may be used for the positioning of a UE.

SUMMARY

Various inventive embodiments for determining the location of user equipment (UE) using radio frequency (RF) wireless signals are described herein, including devices, systems, components, apparatuses, methods, materials, procedures, instructions, code, computer storage medium, and the like.

According to certain embodiments, a method of UE positioning may include receiving positioning assistance data associated with a transmission reception point (TRP), such as an expected reference signal time difference (RSTD) between a reference cell and the TRP; capturing, based on at least the expected RSTD, a first portion of reference signals from the TRP, wherein, at the UE, the first portion of the reference signals does not overlap in time with non-reference signals from the reference cell; and determining a first time of arrival (TOA) of the reference signals from the TRP based on the first portion of the reference signals.

In some embodiments of the method, the reference signals may include long-term evolution (LTE) positioning reference signals (PRS), or new radio (NR) PRS signals. Resource elements for the NR PRS signals may be arranged according to a comb-symbol pattern of an orthogonal frequency-division multiplexing (OFDM) resource block. For example, the resource elements for the NR PRS signals may be in 1, 2, 3, 6, 9, or 12 symbols of the OFDM resource block. The resource elements for the NR PRS signals may be arranged according to, for example, comb-1, comb-2, comb-3, comb-4, comb-6, or comb-12 pattern in the OFDM resource block.

In some embodiments, the method may further include sending the first TOA to a location server. In some embodiments, the method may further include capturing the second portion of the reference signals from the TRP, determining a second TOA of the reference signals from the TRP based on the first portion of the reference signals and the second portion of the reference signals, and selecting a smaller one of the first TOA and the second TOA as an estimated TOA of the reference signals. In some embodiments, the method may further include sending the first TOA and the second TOA to a location server.

In some embodiments of the method, the positioning assistance data may include an uncertainty of the expected RSTD, and the method may further include determining, based on the expected RSTD and the uncertainty of the expected RSTD, a search window for searching the reference signals, where the first portion of the reference signals may start at a time within the search window. The time within the search window may be a predetermined time. In some embodiments, the search window may include a plurality of symbols in a positioning subframe, and the first portion of the reference signals starts at a symbol of the plurality of symbols in the positioning subframe. In some embodiments, the method may further include, for each symbol of one or more symbols in the plurality of symbols in the search window, capturing, starting from the symbol, a respective portion of the reference signals that does not overlap with the non-reference signals from the reference cell, and determining a respective TOA of the reference signals from the TRP based on the respective portion of the reference signals. In some embodiments, the method may further include selecting a smallest TOA from the one or more respective TOAs as an estimated TOA of the reference signals from the TRP.

In some embodiments, receiving the assistance data may include receiving the assistance data from a serving next generation NodeB (gNB) or a location management function (LMF) server. In some embodiments, the method may also include determining a location of the UE using a downlink time difference of arrival (DL-TDOA) technique and based on the first TOA of the reference signals from the TRP.

According to certain embodiments, a device may include a transceiver, a memory, and one or more processors communicatively coupled with the transceiver and the memory and may be configured to perform any of the methods described above and below. According to certain embodiments, a device may include means for performing any of the methods described above and below.

According to certain embodiments, a non-transitory computer-readable medium may include instructions embedded thereon. The instructions, when executed by one or more processing units, cause the processing units to perform the method of any of the methods described above and below.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Aspects of the present disclosure are illustrated by way of example. Non-limiting and non-exhaustive aspects are described with reference to the following figures.

FIGS. 7A-7H illustrate examples of mapping 5G NR downlink (DL) PRS signals to resource elements in a resource block.

Figure 1:
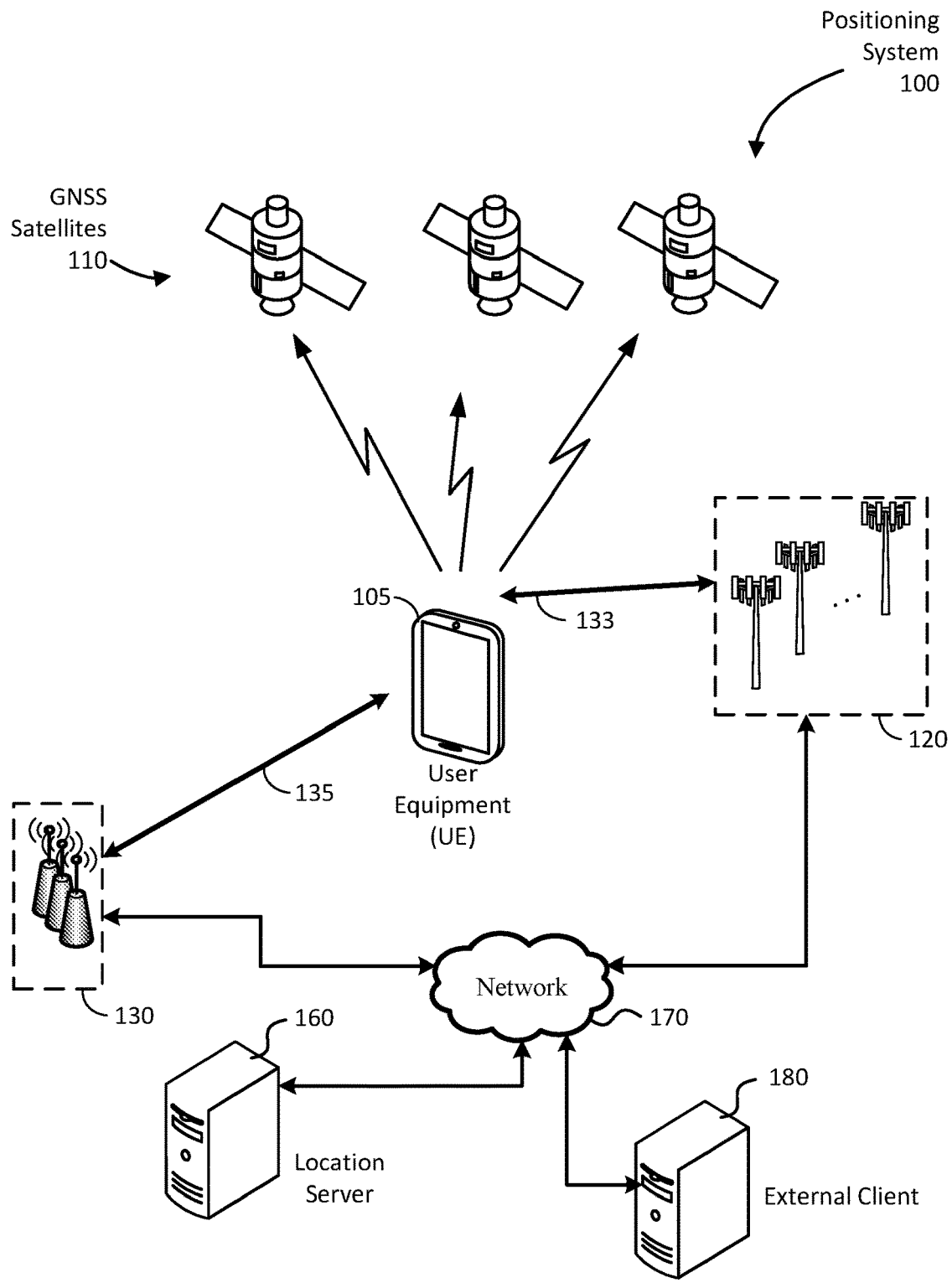
FIG. 1 is a simplified diagram of an example of a positioning system according to certain embodiments.

In the figures, like reference numerals refer to like parts throughout various figures unless otherwise specified. In addition, multiple instances of a component may be distinguished by following the reference numeral by a second label (e.g., a letter or a number), or a dash and a second label. If only the first reference label is used in the specification, the description is applicable to any one of the similar components having the same first reference numeral irrespective of the second label.

DETAILED DESCRIPTION

Techniques disclosed herein generally to wireless communications, and more specifically, to determining the location of user equipment (UE) using radio frequency (RF) wireless signals. Various inventive embodiments are described herein, including devices, systems, components, apparatuses, methods, procedures, instructions, codes, computer-readable storage medium, and the like.

In long-term evolution (LTE) and fifth generation (5G) new radio (NR), reference signals, such as cell-specific reference signal (CRS), positioning reference signal (PRS), tracking reference signal (TRS), demodulation reference signal (DMRS), channel state information reference signals (CSI-RS), or synchronization signal block (SSB), may be used for UE positioning. For example, time difference of arrival (TDOA) of received signals from pairs of transmission reception points (TRPs, such as base stations) may be measured by a UE based on the time of arrival (TOA) of special reference signals embedded in downlink (DL) signals, such as DL PRS signals. Each of the TDOA measurements may define a hyperbola. The intersection of multiple hyperbolas for multiple pairs of TRPs may be the location of the UE. The UE may measure the TDOA by performing a DL reference signal time difference (RSTD) measurement for each neighbor TRP relative to a serving TRP. The RSTD is the relative timing difference between the TOA of a subframe, slot, or symbol from the neighbor TRP and the TOA of a corresponding subframe, slot, or symbol from a reference cell (e.g., the serving TRP). The TOA and RSTD may be measured by performing a search in a search window determined based on the expected RSTD and the expected uncertainty of the RSTD specified in assistance data from, for example, a location server. Signals (e.g., the PRS signals and the synchronization signals) from a neighbor TRP may be detectable when the signal-to-interference-and-noise ratio (SINR) is above a certain threshold, such as at least −13 dB. However, due to the RSTD, the PRS signals received by a UE from a neighbor TRP may collide with non-PRS signals from the serving cell, such as other control or data signals that may be transmitted after or before the PRS signals. Therefore, the signal-to-noise ratio (SNR) of the PRS signals from the neighbor TRP may be degraded, which may in turn affect the accuracy of the TOA or RSTD measurement.

To improve the TOA and RSTD measurement accuracy, it may be desirable to reduce the interference from non-PRS signals and improve the SNR of the PRS signals from TRPs. According to certain embodiments, in order to improve the SNR of PRS signals in the presence of PRS symbol misalignment (and thus improve the accuracy of the PRS positioning), non-colliding PRS symbol(s) may be identified and used to determine the TOA, while the colliding PRS symbols may not be used to determine the TOA. In some embodiments, all PRS symbols in a PRS occasion may be used to determine another TOA, and then a better (e.g., a smaller) TOA may be selected from the TOAs determined with and without using the colliding PRS symbols. Techniques disclosed herein can improve the accuracy of the TOA measurement and thus the accuracy of UE positioning, without changing any hardware, configuration of the reference signals, or resource used for the reference signals.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, wearable (e.g., smartwatch, glasses, augmented reality (AR)/virtual reality (VR) headset, etc.), vehicle (e.g., automobile, motorcycle, bicycle, etc.), Internet of things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" (or UT), a "mobile device," a "mobile terminal," a "mobile station," or variations thereof. Generally, UEs can communicate with a core network via a RAN, and through the core network, the UEs can be connected with external networks (such as the Internet) and with other UEs. Other mechanisms of connecting to the core network and/or the Internet are also possible for the UEs, such as over wired access networks, wireless local area network (WLAN) networks (e.g., based on IEEE 802.11, etc.), and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), and the like. In NR systems, the term "cell" and next generation NodeB (gNB), new radio base station (NR BS), 5G NB, access point (AP), or transmission reception point (TRP) may be used interchangeably. A base station may be used primarily to support wireless access by UEs, including supporting data, voice, and/or signaling connections for the supported UEs. In some systems, a base station may provide purely edge node signaling functions, while in other systems, a based station may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein, the term traffic channel (TCH) can refer to either an uplink/reverse or downlink/forward traffic channel.

In some embodiments, the term "base station" may refer to a single physical TRP or multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency range that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In some instances, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified diagram of an example of a positioning system 100 according to certain embodiments.

In positioning system 100, a UE 105, location server 160, and/or other components of positioning system 100 can use techniques provided herein for determining an estimated location of UE 105. The techniques described herein may be implemented by one or more components of positioning system 100. Positioning system 100 can include UE 105, one or more GNSS satellites 110 (also referred to as space vehicles (SVs)) for a global navigation satellite system (GNSS) such as the global positioning system (GPS), base stations 120, access points (APs) 130, a location server 160, a network 170, and an external client 180. In general, positioning system 100 can estimate location of UE 105 based on RF signals received by and/or sent from UE 105 and known locations of other components (e.g., GNSS satellites 110, base stations 120, or APs 130) transmitting and/or receiving the RF signals. Additional details regarding particular location estimation techniques are discussed in more detail below with regard to, for example, FIG. 2.

FIG. 1 provides a generalized illustration of various components, any or all of which may be utilized as appropriate, and each of which may be duplicated as needed. Specifically, although only one UE 105 is illustrated, it will be understood that many UEs (e.g., hundreds, thousands, millions, etc.) may utilize positioning system 100. Similarly, positioning system 100 may include a larger or smaller number of base stations 120 and/or APs 130 than illustrated in FIG. 1. The illustrated connections that connect the various components in positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, external client 180 may be directly connected to location server 160. A person of ordinary skill in the art will recognize many modifications to the components illustrated.

Depending on the desired functionality, network 170 may include any of a variety of wireless and/or wireline networks. Network 170 can include, for example, any combination of public and/or private networks, local and/or wide-area networks, and the like. Furthermore, network 170 may utilize one or more wired and/or wireless communication technologies. In some embodiments, network 170 may include, for example, a cellular or other mobile network, a wireless local area network (WLAN), a wireless wide-area network (WWAN), and/or the Internet. Examples of network 170 include an LTE wireless network, 5G NR wireless network, a Wi-Fi WLAN, and the Internet. LTE, 5G and NR are wireless technologies defined, or being defined, by the 3rd Generation Partnership Project (3GPP). As used herein, the terms "5G NR," "5G," and "NR" are used interchangeably to refer to these wireless technologies. Network 170 may also include more than one network and/or more than one type of network.

Base stations 120 and access points (APs) 130 are communicatively coupled to network 170. In some embodiments, base station 120s may be owned, maintained, and/or operated by a cellular network provider, and may employ any of a variety of wireless technologies, as described herein below. Depending on the technology of network 170, base station 120 may include a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a next generation radio access network (NG-RAN) which may connect to a 5G core network (5G CN) in the case that Network 170 is a 5G network. An AP 130 may include, for example, a Wi-Fi AP or a Bluetooth® AP. Thus, UE 105 can send and receive information with network-connected devices, such as location server 160, by accessing network 170 via base station 120 using a first communication link 133. Additionally or alternatively, because APs 130 may also be communicatively coupled with network 170, UE 105 may communicate with Internet-connected devices, including location server 160, using a second communication link 135.

A "cell" may generically refer to a logical communication entity used for communication with a base station 120 (e.g., over some frequency resource referred to as a carrier frequency, component carrier (aggregated carrier with an increased bandwidth of, for example, 1.4, 3, 5, 10, 15, 20 MHz or higher), carrier, band, or the like), and may be associated with an identifier (e.g., a physical cell identifier (PCID), a virtual cell identifier (VCID), or a cell global identifier (CGID)) for distinguishing neighbor cells operating via the same or a different carrier frequency. In some examples, a carrier may support multiple cells, and different cells may be configured according to different protocol types (e.g., machine-type communication (MTC), narrowband Internet-of-things (NB-IoT), enhanced mobile broadband (eMBB), or others) that may provide access for different types of devices. In some cases, the term "cell" may refer to a portion of a geographic coverage area (e.g., a sector) over which the logical entity operates.

Location server 160 may comprise a server and/or another computing device configured to determine an estimated location of UE 105 and/or provide data (e.g., "assistance data") to UE 105 to facilitate the location determination. According to some embodiments, location server 160 may include a home secure user plane location (SUPL) location platform (H-SLP), which may support the SUPL user plane (UP) location solution defined by the open mobile alliance (OMA) and may support location services for UE 105 based on subscription information for UE 105 stored in location server 160. In some embodiments, location server 160 may include a discovered SLP (D-SLP) or an emergency SLP (E-SLP). Location server 160 may alternatively include an enhanced serving mobile location center (E-SMLC) that supports location of UE 105 using a control plane (CP) location solution for LTE radio access by UE 105. Location server 160 may further include a location management function (LMF) that supports location of UE 105 using a control plane (CP) location solution for NR radio access by UE 105. In a CP location solution, signaling to control and manage the location of UE 105 may be exchanged between elements of network 170 and with UE 105 using existing network interfaces and protocols and as signaling from the perspective of network 170. In the UP location solution, signaling to control and manage the location of UE 105 may be exchanged between location server 160 and UE 105 as data (e.g., data transported using the Internet protocol (IP) and/or transmission control protocol (TCP)) from the perspective of network 170.

As described above (and discussed in more detail below), the estimated location of UE 105 may be based on measurements of RF signals sent from and/or received by the UE 105. In particular, these measurements can provide information regarding the relative distance and/or angle of UE 105 from one or more components in positioning system 100 (e.g., GNSS satellites 110, APs 130, and base stations 120). The location of UE 105 can be estimated geometrically (e.g., using multi-angulation and/or multi-lateration techniques)

based on the distance and/or angle measurements, along with the known position of the one or more components.

Although terrestrial components such as APs 130 and base stations 120 may be fixed, embodiments are not so limited. In some embodiments, mobile components may be used. Moreover, in some embodiments, the location of UE 105 may be estimated at least in part based on measurements of RF signals communicated between UE 105 and one or more other UEs (not shown in FIG. 1), which may be mobile. Direct communication between UEs in this manner may comprise sidelink and/or similar device-to-device (D2D) communication technologies. Sidelink, which is defined by 3GPP, is a form of D2D communication under the cellular-based LTE and NR standards.

An estimated location of UE 105 can be used in a variety of applications, such as to assist direction finding or navigation for a user of UE 105 or to assist another user (e.g., associated with external client 180) to locate UE 105. A "location" is also referred to herein as a "location estimate", "estimated location", "location", "position", "position estimate", "position fix", "estimated position", "location fix", or "fix". A location of UE 105 may include an absolute location of UE 105 (e.g., a latitude and longitude and possibly altitude) or a relative location of UE 105 (e.g., a location expressed as distances north or south, east or west and possibly above or below some other known fixed locations or some other locations such as a location for UE 105 at some known previous time). A location may also be specified as a geodetic location (as a latitude and longitude) or as a civic location (e.g., in terms of a street address or using other location related names and labels). A location may further include an uncertainty or error indication, such as a horizontal and possibly vertical distance by which the location is expected to be in error or an indication of an area or volume (e.g., a circle or ellipse) within which UE 105 is expected to be located with some level of confidence (e.g., a 95% confidence level).

External client 180 may be a web server or remote application that may have some association with UE 105 (e.g., may be accessed by a user of UE 105), or may be a server, application, or computer system providing a location service to some other users, which may include obtaining and providing the location of UE 105 (e.g., to enable a service such as friend or relative finder, asset tracking or child or pet location). Additionally or alternatively, external client 180 may obtain and provide the location of UE 105 to an emergency service provider, government agency, and the like.

Figure 2:
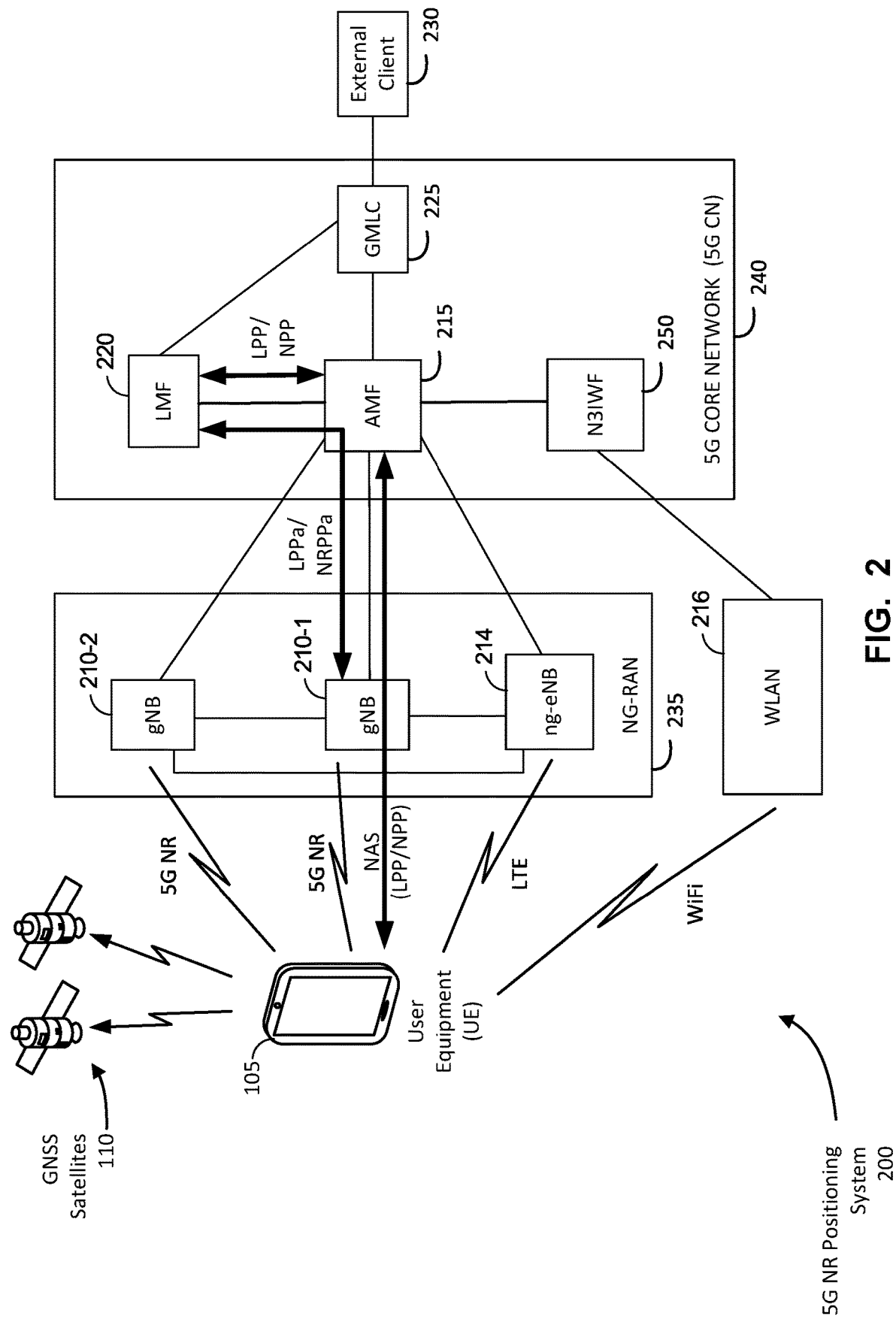
FIG. 2 is a diagram of an example of a positioning system using fifth generation (5G) new radio (NR) according to certain embodiments.

As previously noted, positioning system 100 can be implemented using a wireless communication network, such as an LTE-based or 5G NR-based network. FIG. 2 shows a diagram of a 5G NR positioning system 200, which may be an embodiment of a positioning system (e.g., positioning system 100) implementing 5G NR. 5G NR positioning system 200 may be configured to determine the location of a UE 105 using access nodes (e.g., gNBs 210, ng-eNB 214, or WLAN 216) (which may correspond with base stations 120 and access points 130 of FIG. 1), and, optionally, an LMF 220 (which may correspond with location server 160) to implement one or more positioning methods. In the illustrated example, 5G NR positioning system 200 may include UE 105 and components of 5G NR network, such as a next generation (NG) radio access network (RAN) (NG-RAN) 235 and a 5G core network (CN) 240. A 5G network may also be referred to as an NR network. NG-RAN 235 may be referred to as a 5G RAN or as an NR RAN. 5G CN 240 may be referred to as an NG Core network. Standardization of an NG-RAN and 5G CN is ongoing in 3GPP. Accordingly, NG-RAN 235 and 5G CN 240 may conform to current or future standards for 5G support from 3GPP. 5G NR positioning system 200 may further utilize information from GNSS satellites 110 from a GNSS system such as global positioning system (GPS) or a similar system. Examples of components of 5G NR positioning system 200 are described below. 5G NR positioning system 200 may include additional or alternative components that may not be described in FIG. 2.

It is noted that FIG. 2 only provides a generalized illustration of various components, any or all of which may be utilized as appropriate, and each of which may be duplicated or omitted as desired. Specifically, although only one UE 105 is illustrated, it will be understood that many UEs (e.g., hundreds, thousands, millions, etc.) may utilize 5G NR positioning system 200. Similarly, 5G NR positioning system 200 may include a larger (or smaller) number of GNSS satellites 110, gNBs 210, ng-eNBs 214, WLANs 216, access and mobility functions (AMFs) 215, external clients 230, and/or other components. The illustrated connections that connect the various components in 5G NR positioning system 200 include data and signaling connections which may include additional (or intermediary) components, direct or indirect physical and/or wireless connections, and/or additional networks. Furthermore, components may be rearranged, combined, separated, substituted, and/or omitted, depending on desired functionality.

In 5G NR networks, the frequency spectrum in which wireless nodes (e.g., base stations or UEs) operate is divided into multiple frequency ranges, including FR 1 (e.g., from 450 to 6000 MHz), FR 2 (e.g., from 24250 to 52600 MHz), FR 3 (above 52600 MHz), and FR 4 (between FR 1 and FR 2). In a multi-carrier system, such as a 5G network, one of the carrier frequencies is referred to as the "primary carrier," "anchor carrier," "primary serving cell," or "PCell," and the remaining carrier frequencies may be referred to as "secondary carriers," "secondary serving cells," or "SCells." In carrier aggregation, the anchor carrier may be the carrier operating on the primary frequency (e.g., FR 1) utilized by a UE and the cell in which the UE either performs the initial radio resource control (RRC) connection establishment procedure or initiates the RRC connection re-establishment procedure. The primary carrier carries all common and UE-specific control channels and may sometimes be a carrier in a licensed frequency. A secondary carrier is a carrier operating on a second frequency (e.g., FR 2) that may be configured once the RRC connection is established between the UE and the anchor carrier and that may be used to provide additional radio resources. In some cases, the secondary carrier may be a carrier in an unlicensed frequency. The secondary carrier may contain only necessary signaling information and signals. The network may be able to change the primary carrier of any UE at any time. This may be done, for example, to balance the load on different carriers. Because a "serving cell" (whether a PCell or an SCell) corresponds to a carrier frequency or component carrier over which some base stations are communicating, the term "cell," "serving cell," "component carrier," "carrier frequency," and the like can be used interchangeably.

In order to be able to carry the data across a 5G radio access network, the data and information may be organized into a number of data channels. By organizing the data into various channels, a 5G communication system is able to manage the data transfers in an orderly fashion and the system is able to understand what data is arriving and hence is able to process it in a desired fashion. In order to group the data to be sent over the 5G NR radio access network, the data may be organized in a logical way. Because there are many different functions for the data being sent over the radio communications link, several different forms of data channel are used. The higher level channels are "mapped" or contained within others until finally at the physical level, where the channel contains data from higher level channels. The use of these 5G channels provide a method for organizing the data flow over the radio interface of the 5G communications network.

In 5G NR, an antenna port is defined such that the channel over which a symbol on the antenna port is conveyed can be inferred from the channel over which another symbol on the same antenna port is conveyed. The antenna port is logical concept related to physical layer (L1), rather than a physical concept (e.g., a physical antenna). Each antenna port represents a specific channel model, and may carry its own resource grid and a specific set of reference signal in the grid. Each individual downlink transmission may be carried out from a specific antenna port, the identity of which is known to the UE, and the UE can assume that two transmitted signals experience the same radio channel if and only if they are transmitted from the same antenna port. In other words, the channel properties for resource elements (RE) of the reference signal are assumed to be same as (or very close to) the resource elements for other data (e.g., REs for Physical Downlink Shared Channel (PDSCH)). Therefore, data can be demodulated using the channel information obtained by the analysis of the reference channel. In practical, each antenna port, at least for the downlink transmission, can be stated as corresponding to a specific reference signal. The reference signal can be used by the UE to derive channel-state information related to the antenna port. The UE receiver can assume that this reference signal can be used to estimate the channel corresponding to specific antenna port. The supported set of antenna ports depends on the reference signal configuration in the cell. For example, for CRS signals, the set of antenna ports can include p=0, p∈{0, 1}, or p∈{0, 1, 2, 3}.

In 5G NR positioning system 200, UE 105 may include and/or may be referred to as a device, a mobile device, a wireless device, a mobile terminal, a terminal, a mobile station (MS), a secure user plane location (SUPL)-enabled terminal (SET), or by another name. Moreover, UE 105 may correspond to a cellphone, smartphone, laptop, tablet, personal data assistant (PDA), Internet of things (IoT) device, or some other portable or moveable device. Typically, though not necessarily, UE 105 may support wireless communications using one or more RATs, such as using global system for mobile communications (GSM), code division multiple access (CDMA), wideband CDMA (WCDMA), long-term evolution (LTE), high rate packet data (HRPD), IEEE 802.11 Wi-Fi®, Bluetooth, worldwide interoperability for microwave access (WiMAX™), 5G NR (e.g., using the NG-RAN 235 and 5G CN 240), and the like. UE 105 may also support wireless communication using a WLAN 216 which (like the one or more RATs, and as previously noted with respect to FIG. 1) may connect to other networks, such as the Internet. The use of one or more of these RATs may allow UE 105 to communicate with an external client 230 (e.g., via elements of 5G CN 240 not shown in FIG. 2, or possibly via a gateway mobile location center (GMLC) 225) and/or allow the external client 230 to receive location information regarding the UE 105 (e.g., via the GMLC 225).

UE 105 may include a single entity or may include multiple entities, such as in a personal area network where a user may employ audio, video, and/or data I/O devices, and/or body sensors and a separate wireline or wireless modem. An estimate of a location of UE 105 may be referred to as a location, location estimate, location fix, fix, position, position estimate, or position fix, and may be geodetic, thus providing location coordinates for UE 105 (e.g., latitude and longitude), which may or may not include an altitude component (e.g., height above sea level, height above or depth below ground level, floor level or basement level). Alternatively, a location of UE 105 may be expressed as a civic location (e.g., as a postal address or the designation of some point or small area in a building such as a particular room or floor). A location of UE 105 may also be expressed as an area or volume (defined either geodetically or in civic form) within which UE 105 is expected to be located with some probability or confidence level (e.g., 67%, 95%, etc.). A location of UE 105 may further be a relative location comprising, for example, a distance and direction or relative X and Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g., for latitude, longitude and altitude above or below the mean sea level).

Base stations in NG-RAN 235 shown in FIG. 2 may correspond to base stations 120 in FIG. 1 and may comprise a transmission reception point (TRP). NG-RAN 235 may include next generation NodeB (gNB) 210-1 and 210-2 (collectively and generically referred to herein as gNBs 210) and/or an antenna of a gNB. Pairs of gNBs 210 in NG-RAN 235 may be connected to one another (e.g., directly as shown in FIG. 2 or indirectly via other gNBs 210). Access to the 5G network is provided to UE 105 via wireless communications between UE 105 and one or more of the gNBs 210, which may provide wireless communication access to 5G CN 240 on behalf of UE 105 using 5G NR. 5G NR radio access may also be referred to as NR radio access or as 5G radio access. In FIG. 2, serving gNB for UE 105 is assumed to be gNB 210-1, although other gNBs (e.g., gNB 210-2) may act as a serving gNB if UE 105 moves to another location or may act as a secondary gNB to provide additional throughput and bandwidth to UE 105.

Base stations in NG-RAN 235 shown in FIG. 2 may alternatively or additionally include a next generation evolved Node B, also referred to as an ng-eNB 214. Ng-eNB 214 may be connected to one or more gNBs 210 in NG-RAN 235, directly or indirectly via other gNBs 210 and/or other ng-eNBs. Ng-eNB 214 may provide LTE wireless access and/or evolved LTE (eLTE) wireless access to UE 105. Some gNBs 210 (e.g., gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214.

5G NR positioning system 200 may also include one or more WLANs 216, which may connect to a Non-3GPP InterWorking Function (N3IWF) 250 in 5G CN 240 (e.g., in the case of an untrusted WLAN 216). For example, WLAN 216 may support IEEE 802.11 Wi-Fi access for UE 105 and may comprise one or more Wi-Fi APs (e.g., APs 130 of FIG.

1). In the illustrated example, N3IWF 250 may connect to other elements in 5G CN 240 such as AMF 215. In some embodiments, WLAN 216 may support another RAT such as Bluetooth. N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IP Sec protocols with UE 105, termination of N2 and N3 interfaces to 5G CN 240 for control plane and user plane, respectively, relaying of uplink and downlink control plane Non-Access Stratum (NAS) signaling between UE 105 and AMF 215 across an N1 interface. In some other embodiments, WLAN 216 may connect directly to elements in 5G CN 240 (e.g., AMF 215) and not via N3IWF 250, for example, when WLAN 216 is a trusted WLAN for 5G CN 240. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information for multiple RATs from LMF 220, take measurements for one of the multiple RATs (e.g., measurements of the UE 105) and/or obtain measurements from the UE 105 that are transferred to the access node using one or more of the multiple RATs. As noted, while FIG. 2 depicts gNBs 210, ng-eNB 214, and WLAN 216 configured to communicate according to 5G NR, LTE, and Wi-Fi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5G CN 240 in FIG. 2. The methods and techniques described herein for UE 105 positioning using common or generic positioning procedures may be applicable to such other networks.

gNBs 210 and ng-eNB 214 can communicate with an AMF 215, which, for positioning functionality, communicates with an LMF 220. The AMF 215 may support mobility of the UE 105, including cell change and handover of UE 105 from an access node (e.g., gNBs 210, ng-eNB 214, or WLAN 216) of a first RAT to an access node (e.g., gNBs 210, ng-eNB 214, or WLAN 216) of a second RAT. The AMF 215 may also participate in supporting a signaling connection to the UE 105 and possibly data and voice bearers for the UE 105. The LMF 220 may support positioning of the UE 105 when UE 105 accesses the NG-RAN 235 or WLAN 216 and may support position procedures and methods, including UE assisted/UE based and/or network based procedures/methods, such as assisted GNSS (A-GNSS), observed time difference of arrival (OTDOA), real time kinematics (RTK), precise point positioning (PPP), differential GNSS (DGNSS), ECID, angle of arrival (AOA), angle of departure (AOD), WLAN positioning, and/or other positioning procedures and methods. The LMF 220 may also process location services requests for the UE 105, e.g., received from the AMF 215 or from GMLC 225. LMF 220 may be connected to AMF 215 and/or to GMLC 225. LMF 220 may be referred to by other names such as a location manager (LM), location function (LF), commercial LMF (CLMF), or value added LMF (VLMF). In some embodiments, a node/system that implements the LMF 220 may additionally or alternatively implement other types of location-support modules, such as an evolved serving mobile location center (E-SMLC) or service location protocol (SLP). It is noted that in some embodiments, at least part of the positioning functionality (including determination of a UE's location) may be performed at the UE 105 (e.g., by processing PRS signals transmitted by wireless nodes such as TRPs (e.g., gNBs 210, ng-eNB 214 and/or WLAN 216) and/or other UEs), and/or using assistance data provided to the UE 105, e.g., by LMF 220).

The gateway mobile location center (GMLC) 225 may support a location request for the UE 105 received from an external client 230 and may forward such a location request to the AMF 215 for forwarding by the AMF 215 to the LMF 220, or may forward the location request directly to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230. The GMLC 225 is shown connected to both the AMF 215 and LMF 220 in FIG. 2 though only one of these connections may be supported by 5G CN 240 in some implementations.

As further illustrated in FIG. 2, LMF 220 may communicate with gNBs 210 and/or with ng-eNB 214 using the LPPa protocol (which also may be referred to as NRPPa or NPPa). LPPa protocol in NR may be the same as, similar to, or an extension of the LPPa protocol in LTE (related to LTE positioning protocol (LPP)), with LPPa messages being transferred between a gNB 210 and the LMF 220, and/or between an ng-eNB 214 and the LMF 220, via the AMF 215. As further illustrated in FIG. 2, LMF 220 and UE 105 may communicate using the LPP protocol. LMF 220 and UE 105 may also or instead communicate using an LPP protocol (which, in NR, also may be referred to as NRPP or NPP). Here, LPP messages may be transferred between the UE 105 and the LMF 220 via the AMF 215 and a serving gNB 210-1 or serving ng-eNB 214 for UE 105. For example, LPP and/or LPP messages may be transferred between the LMF 220 and the AMF 215 using messages for service-based operations (e.g., based on the hypertext transfer protocol (HTTP)) and may be transferred between the AMF 215 and the UE 105 using a 5G NAS protocol. The LPP and/or LPP protocol may be used to support positioning of UE 105 using UE assisted and/or UE based position methods such as A-GNSS, RTK, OTDOA and/or enhanced Cell ID (ECID). The LPPa protocol may be used to support positioning of UE 105 using network based position methods such as ECID (e.g., when used with measurements obtained by a gNB 210 or ng-eNB 214) and/or may be used by LMF 220 to obtain location related information from gNBs 210 and/or ng-eNB 214, such as parameters defining DL PRS transmission from gNBs 210 and/or ng-eNB 214.

In the case of UE 105 access to WLAN 216, LMF 220 may use LPPa and/or LPP to obtain a location of UE 105 in a similar manner to that just described for UE 105 access to a gNB 210 or ng-eNB 214. Thus, LPPa messages may be transferred between a WLAN 216 and the LMF 220, via the AMF 215 and N3IWF 250 to support network-based positioning of UE 105 and/or transfer of other location information from WLAN 216 to LMF 220. Alternatively, LPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using LPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

With a UE-assisted position method, UE 105 may obtain location measurements and send the measurements to a location server (e.g., LMF 220) for computation of a location estimate for UE 105. Location measurements may include one or more of a received signal strength indication (RSSI), reference signal time difference (RSTD), round trip signal propagation time (RTT), reference signal receive power (RSRP), reference signal received quality (RSRQ), time of arrival (TOA), angle of arrival (AOA), differential AOA (DAOA), AOD, or timing advance (TA) for gNBs 210, ng-eNB 214, and/or one or more access points for WLAN 216. The location measurements may also or instead include measurements of RAT-independent positioning methods such as GNSS (e.g., GNSS pseudorange, GNSS code phase, and/or GNSS carrier phase for GNSS satellites 110), WLAN, etc. With a UE-based position method, UE 105 may obtain location measurements (e.g., which may be the same as or similar to location measurements for a UE assisted position method) and may further compute a location of UE 105 (e.g., with the help of assistance data received from a location server such as LMF 220 or broadcast by gNBs 210, ng-eNB 214, or WLAN 216). With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AOA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

As described above, in some embodiments, a physical transmission point (e.g., base station) may include an array of antennas for beamforming. Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated such that they may appear to a receiver (e.g., a UE) as having the same parameters, regardless of whether or not the transmitting antennas of the network node are physically collocated. The radio channel parameters or properties that may be common across the antenna ports include Doppler spread/shift, average delay, delay spread, average gain, spatial receiver parameters, and the like. Doppler shift is a shift in the frequency of the radio signal relative to motion of the receiver. Doppler spread is also referred to as the fading rate, and indicates a difference between the signal frequency at the transmitter and the signal frequency at the receiver as a function of time (e.g., the rate at which the frequency changes over time). When a signal is transmitted from one or more antennas, it may reach a receiver through multiple paths due to reflection from surrounding clutter. The average time for the receiver to receive the multi-path components of the signal is the average delay. The difference between the time of arrival of the earliest significant multi-path component (e.g., the Line of Sight (LOS) component) and the time of arrival of the last significant multi-path component is the delay spread. Spatial receiver parameter refers to beam forming properties of downlink received signal, such as dominant AOA and average AOA at the receiver.

In NR, there may be four types of quasi-collocation (QCL) relations. A QCL relation of a given type indicates that certain parameters regarding a second (target) reference RF signal on a second (target) beam can be derived from information about a source reference RF signal on a source beam. More specifically, if the source reference RF signal is QCL Type A, the receiver may use the source reference RF signal to estimate the Doppler shift, Doppler spread, average delay, and delay spread of a second (target) reference RF signal transmitted on the same channel. If the source reference RF signal is QCL Type B, the receiver may use the source reference RF signal to estimate the Doppler shift and Doppler spread of a second reference RF signal transmitted on the same channel. If the source reference RF signal is QCL Type C, the receiver may use the source reference RF signal to estimate the Doppler shift and the average delay of a second reference RF signal transmitted on the same channel. If the source reference RF signal is QCL Type D, the receiver may use the source reference RF signal to estimate the spatial receive parameter of a second reference RF signal transmitted on the same channel.

In receive beamforming, the receiver may amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain in other directions, or the beam gain in that direction is the highest among receive beams available to the receiver. This may result in a stronger received signal strength (e.g., RSRP, RSRQ, SINR, etc.) of the RF signals received from that direction.

In some cases, receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), navigation reference signals (NRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

A downlink beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an uplink beam may be either a transmit beam or a receive beam, depending on the entity forming it. For example, if a base station is forming the uplink beam, it is an uplink receive beam, and if a UE is forming the uplink beam, it is an uplink transmit beam.

Positioning methods in wireless networks can use wireless signals of the wireless networks and thus may be dependent on the radio access technology (RAT), or can be independent of the RAT (e.g., using signals such as GPS signal). In a 5G NR positioning system (e.g., 5G NR positioning system 200), location measurements (e.g., AOA, AOD, TOA, RSTD) taken by the UE may use RF reference signals received from two or more base stations. For example, in DL-TDOA positioning, the UE may measure the RSTD, which represents the relative time difference between two TRPs with respect to the UE. In DL-TDOA, DL-AOD, or multi-RTT positioning, the UE may measure the RSRP, which represents the average received power of a single reference signal resource element. As described above, examples of the RF reference signals may include PRS that is defined for NR positioning to enable UEs to detect and measure using more neighbor TRPs. PRS can be used, for example, to perform the TDOA, AOD, and RTT-based positioning techniques. Compared with LTE CRS, PRS has a more regular structure and a larger bandwidth, which allows for a higher sampling rate and a more precise correlation and TOA estimation. Other reference signals that can be used for positioning may include CRS, CSI-RS, synchronization signals, radio resource management (RRM) signals, and the like. The reference signals may be transmitted in a Tx beam (e.g., using beamforming techniques), which may impact angular measurements, such as AOD. Table 1 below summarizes reference signals and measurements performed by UEs in some examples of RAT-dependent positioning techniques.

TABLE 1

Reference signals and Measurements for examples of positioning techniques

| DL/UL Reference Signals | UE Measurements | Positioning techniques |
| --- | --- | --- |
| DL-PRS | DL-RSTD | DL-TDOA |
| DL-PRS | DL-PRS RSRP | DL-TDOA, DL-AoD, Multi-RTT |
| DL-PRS/SRS-for-positioning | UE Rx-Tx | Multi-RTT |
| SSB/CSI-RS for RRM | SS-RSRP (RSRP for RRM), SS-RSRQ (for RRM), CSI-RSRP (for RRM), CSI-RSRQ (for RRM) | E-CID |

Figures 3A, 3B, 3C:
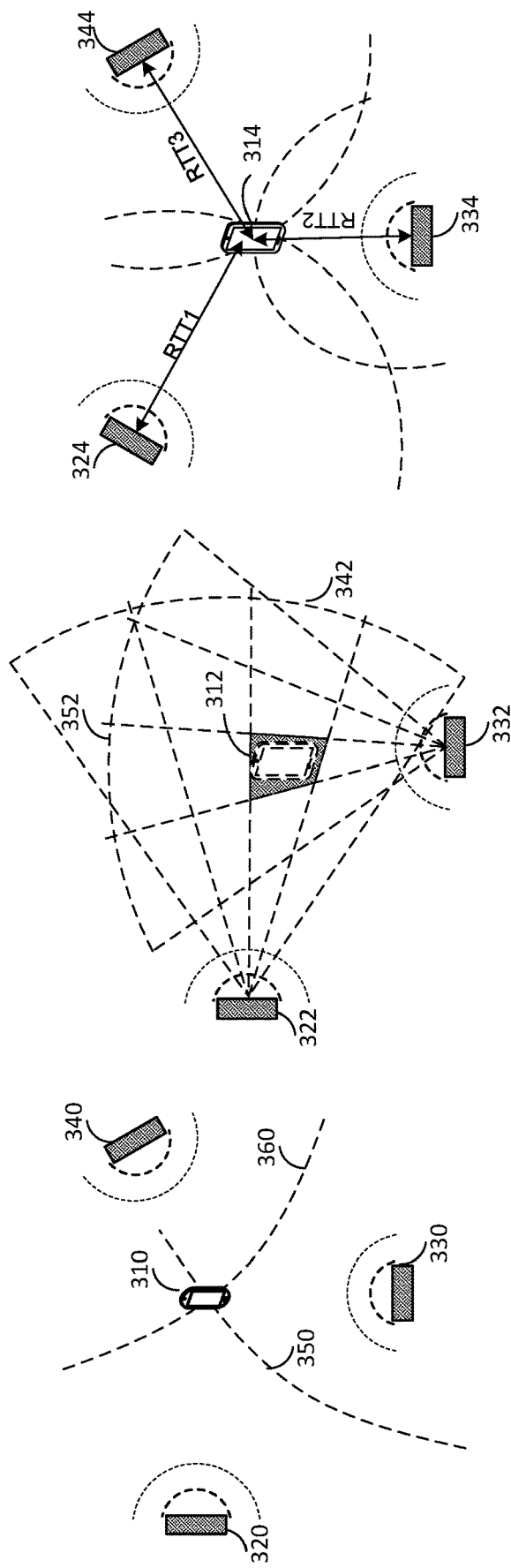
FIGS. 3A-3C illustrate examples of radio access technology (RAT)-dependent NR positioning techniques.

FIGS. 3A-3C illustrate different RAT-dependent NR positioning technologies. NR positioning technologies supported in 5G NR include downlink (DL)-only, uplink (UL)-only, and combined DL and UL positioning methods. For example, DL-based positioning techniques may include DL time difference of arrival (DL-TDOA, also referred to as the observed time difference of arrival (OTDOA)) or DL angle of departure (DL-AOD) technique. UL-based positioning techniques may include UL time difference of arrival (UL-TDOA) or UL angle of arrival (UL-AOA) technique. Combined DL and UL positioning techniques may include round-trip time (RTT) positioning techniques using multiple neighboring base stations, which may be referred to as multi-RTT positioning technique.

In OTDOA-based positioning, a location server may provide, to a UE, OTDOA assistance data for a reference base station (which may be called a "reference cell" or "reference resource") and one or more neighboring base stations (which may be called "neighbor cells" or "neighboring cells", and which individually may be called a "target cell" or "target resource") relative to the reference base station. For example, the assistance data may provide the center channel frequency of each base station, various PRS configuration parameters (e.g., consecutive PRS positioning subframes $N_{PRS}$, PRS periodicity $T_{PRS}$, muting sequence, frequency hopping sequence, PRS ID, PRS bandwidth), a base station (cell) global ID, PRS signal characteristics associated with a directional PRS, and/or other base station related parameters applicable to OTDOA or some other position method. OTDOA-based positioning by a UE may be facilitated by indicating the serving base station for the UE in the OTDOA assistance data (e.g., with the reference base station indicated as being the serving base station). In some aspects, OTDOA assistance data may also include "expected Reference Signal Time Difference (RSTD)" parameters, which provide the UE with information about the RSTD values the UE is expected to measure at its current location between the reference base station and each neighbor base station, together with an uncertainty of the expected RSTD parameter. The expected RSTD, together with the associated uncertainty, may define a search window for the UE within which the UE is expected to measure the RSTD value. OTDOA assistance information may also include PRS configuration information parameters, which allow a UE to determine when a PRS positioning occasion occurs on signals received from various neighbor base stations relative to PRS positioning occasions for the reference base station, and to determine the PRS sequence transmitted from various base stations in order to measure a time of arrival (TOA) or RSTD. TOA measurements may be RSRP measurements of average power of resource elements (RE) that carry PRS (or other reference signals).

Using the RSTD measurements, the known absolute or relative transmission timing of each base station, and the known position(s) of wireless node physical transmitting antennas for the reference and neighboring base stations, the UE position may be calculated (e.g., by the UE P105 or by a location server). More particularly, the RSTD for a neighbor base station "k" relative to a reference base station "Ref," may be given as the difference in TOA measurements of signals from each base station (i.e., $TOA_k - TOA_{Ref}$), where the TOA values may be measured modulo one subframe duration (e.g., about 1 ms) to remove the effects of measuring different subframes at different times.

FIG. 3A illustrates an example of downlink-based positioning using the DL-TDOA technique. In the illustrated example, a UE 310 may receive downlink signals from three TRPs. Based on the difference in the arrival times of signals (TDOA) from two TRPs to UE 310, UE 310 may be determined to be on a hyperbola with one of the TRPs at the focal point of the hyperbola. For example, based on the TDOA from two TRPs 320 and 330 (e.g., the reference TRP) to UE 310, UE 310 may determine that it is on a hyperbola 350 with TRP 330 at the focal point of hyperbola 350. Similarly, based on the TDOA from two TRPs 340 and 330 to UE 310, UE 310 may determine that it is on a hyperbola 360 with TRP 340 at the focal point of hyperbola 360. Therefore, UE 310 may be at the intersection point of hyperbola 350 and hyperbola 360.

AOD-based positioning is based on reference signals (e.g., PRS signals) transmitted by certain beams of base stations and received by a UE, and a corresponding coverage area covered by the beams. In AOD-based positioning, a location server may provide AOD assistance data to a UE. This assistance data, which may be based on an approximate location of the UE, may provide information regarding reference signals for nearby base stations, including center channel frequency of each base station, various PRS configuration parameters (e.g., consecutive PRS subframes, PRS periodicity, muting sequence, frequency hopping sequence, PRS ID, PRS bandwidth, beam ID, etc.), a base station (cell) global ID, PRS signal characteristics associated with a directional PRS, and/or other base station related parameters applicable to AOD or some other position methods. Using this information, the UE and/or location server can determine the UE's location by the beam(s) with which the UE detects a PRS from each base station.

FIG. 3B illustrates an example of downlink-based positioning using the DL-AOD technique. In DL-AOD positioning, a TRP may transmit AOD information using an array of antennas. A UE may determine its own position based on the positions of multiple TRPs and the directions (angles or bins) of the beams from the multiple TRPs. In the illustrated example, a UE 312 may receive signals from TRP 322 and TRP 332. Based on the locations of TRP 322 and TRP 332 and the directions or bins 342 and 352 of the beams from TRP 322 and TRP 332, UE 312 may determine that it is at the intersection point or area of a beam (correspond to a certain bin) from TRP 322 and a beam (correspond to a certain bin) from TRP 332.

In RTT-based positioning, the position of a UE is determined based on known positions of base stations and known distances between the UE and the base stations. RTT measurements between the UE and each base station are used to determine a distance between the UE and the respective base station, and multi-lateration techniques can be used to determine the location of the UE. In RTT-based positioning, a location server may coordinate RTT measurements between the UE and each base station. Information provided to the UE may be included in RTT assistance data. This can include, for example, reference signal (e.g., PRS) timing and other signal characteristics, base station (cell) ID, and/or other base station related parameters applicable to multi-RTT or some other position method. Depending on desired functionality, RTT measurements may be made (and initiated by) the UE or a base station.

RTT measurements measure distance using Over the Air (OTA) delay. An initiating device (e.g., the UE or a base station) may transmit a first reference signal at a first time T1, where the first reference signal may propagate to a responding device. At a second time T2, the first reference signal may arrive at the responding device. The OTA delay (i.e., the propagation time it takes for the first reference signal to travel from the initiating device to the responding device) is the difference between T1 and T2. The responding device may then transmit a second reference signal at a third time T3, and the second reference signal may be received and measured by the initiating device at a fourth time T4. In some embodiments, RSRP measurements may be used to determine TOA for times T2 and T4. Distance d between the initiating and responding devices therefore can be determined using the following equation:

$$\frac{2d}{c} = (T_4 - T_1) - (T_3 - T_2) = (T_4 - T_1) + (T_2 - T_3),$$

where distance d divided by the speed of RF propagation c equals the OTA delay. Thus, a precise determination of the distance between the initiating device and responding device can be made.

FIG. 3C illustrates an example of downlink-based positioning using the RTT positioning technique. In the illustrated example, both uplink and downlink signals are used to determine the round-trip time (and thus a distance) from a UE 314 to a TRP 324, 334, or 344. Based on the round-trip time (e.g., RTT1, RTT2, or RTT3) between UE 314 and a TRP, UE 314 may be determined to be on a circle with the TRP at the center of the circle. Using the round-trip time between UE 314 and each of three or more TRPs, UE 314 may be determined to be at the intersection point of three or more circles.

Figure 4:
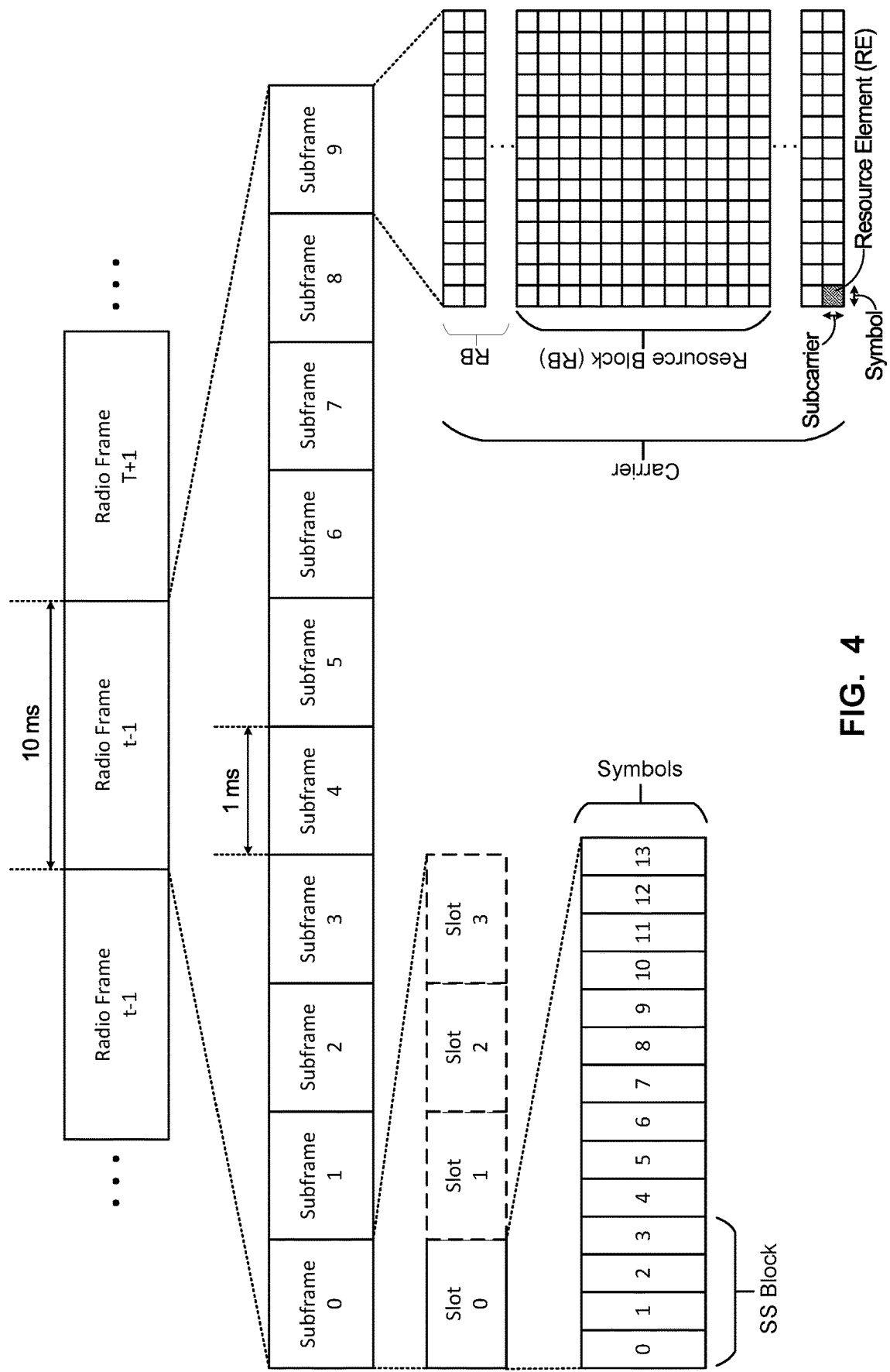
FIG. 4 illustrates an example of a frame structure for 5G NR communication.

FIG. 4 is a diagram illustrating an example of a frame structure 400 for NR and associated terminology, which can serve as the basis for physical layer communication between UE 105 and the base stations, such as serving gNB 210-1. The transmission timeline for each of the downlink and uplink may be partitioned into units of radio frames (or simply frames). Each radio frame may have a predetermined duration (e.g., about 10 ms) and may be partitioned into 10 subframes, each of about 1 ms, with indices of 0 through 9. Each subframe may include a variable number (e.g., I-4) of slots depending on the subcarrier spacing. Each slot may include multiple symbols, such as 7 or 14 symbols, depending on the subcarrier spacing. The symbols in each slot may have assigned indices. A mini slot may comprise a sub slot structure (e.g., 2, 3, or 4 symbols).

A resource grid may be used to represent time slots and spectrum, each time slot including one or more time-concurrent resource blocks (RBs) (also referred to as physical RBs (PRBs)) in the frequency domain. Also shown in FIG. 4 is the complete orthogonal frequency-division multiplexing (OFDM) of a subframe, illustrating how a subframe can be divided into a plurality of resource blocks (RBs). A single RB can comprise, for example, a grid of resource elements (REs) spanning 14 symbols and 12 subcarriers. An RE may correspond to one symbol length in the time domain and one subcarrier in the frequency domain. Each symbol in a slot may be associated with a link direction (e.g., downlink (DL), uplink (UL), or flexible) of data transmission and the link direction for each subframe may be dynamically switched. The link directions may be based on the slot format. Each slot may include DL/UL data as well as DL/UL control information.

The system bandwidth may be divided into multiple (K) orthogonal subcarriers, which may also be referred to as tones, bins, and the like. Each subcarrier may be modulated with data. Modulated symbols may be sent in the frequency domain with, for example, OFDM, and in the time domain with, for example, single-carrier frequency division multiplexing (SC-FDM). The spacing between adjacent subcarriers may be fixed, and the total number of subcarriers K may depend on the system bandwidth. For example, the spacing of the subcarriers may be 15 kHz and the minimum resource allocation (resource block) may be 12 subcarriers (for a total bandwidth of 180 kHz per RB). The nominal FFT size may be equal to 128, 256, 512, 1024, or 2048 for system bandwidth of 1.25, 2.5, 5, 10, or 20 MHz, respectively. The system bandwidth may also be partitioned into sub-bands. For example, a sub-band may cover 1.08 MHz (i.e., 6 resource blocks), and there may be 1, 2, 4, 8, or 16 sub-bands for system bandwidth of 1.25, 2.5, 5, 10, or 20 MHz, respectively.

LTE supports a single numerology defined by, for example, the subcarrier space, symbol length, and cyclic prefix (CP). In contrast, NR may support multiple numerologies (0, for example, a subcarrier spacing (SCS) of 15 kHz (the base subcarrier spacing), 30 kHz, 60 kHz, 120 kHz, 240 kHz, or greater may be available. Table 2 below lists some examples of parameters for different NR numerologies.

positioning system 200) and/or in LTE. Similar to FIG. 4, time is represented horizontally (e.g., on an X axis) in FIG. 5, with time increasing from left to right. Frequency is represented vertically (e.g., on a Y axis) with frequency increasing (or decreasing) from bottom to top.

Figure 5:
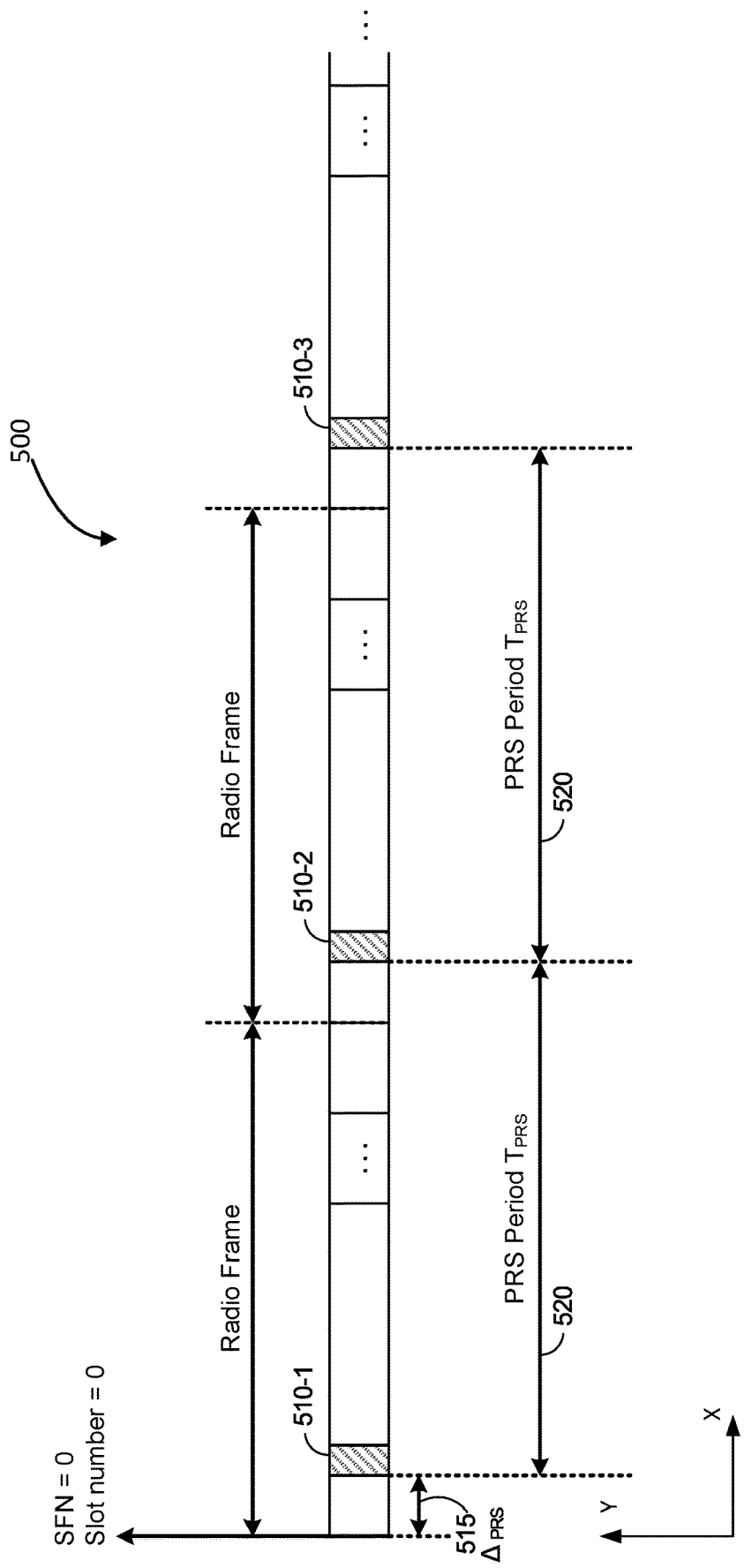
FIG. 5 illustrates an example of a radio frame sequence with positioning reference signal (PRS) positioning occasions.

FIG. 5 shows how PRS positioning occasions 510-1, 510-2, and 510-3 (collectively and generically referred to herein as PRS positioning occasions 510) are determined by a System Frame Number (SFN), a cell-specific subframe offset ($\Delta_{PRS}$) 515, and a PRS Periodicity ($T_{PRS}$) 520. The PRS subframe configuration may be defined by a "PRS Configuration Index," $I_{PRS}$, included in assistance data (e.g., OTDOA assistance data), which may be defined by governing 3GPP standards. Cell-specific subframe offset ($\Delta_{PRS}$) 515 may be defined in terms of the number of subframes transmitted starting from System Frame Number (SFN) 0 to the start of the first (subsequent) PRS positioning occasion.

A PRS may be transmitted by wireless nodes (e.g., base stations 120 or other UEs) after appropriate configuration (e.g., by an Operations and Maintenance (O&M) server). A PRS may be transmitted in special positioning subframes or slots that are grouped into PRS positioning occasions 510. For example, a PRS positioning occasion 510-1 can comprise $N_{PRS}$ consecutive positioning subframes where the number $N_{PRS}$ may be between 1 and 160 (e.g., may include the values 1, 2, 4 and 6 as well as other values). PRS positioning occasions 510 may be grouped into one or more PRS occasion groups. As noted, PRS positioning occasions 510 may occur periodically at an interval $T_{PRS}$ (milliseconds or subframes), where $T_{PRS}$ may be 5, 10, 20, 40, 80, 160, 320, 640, or 1280 (or any other appropriate value). In some aspects, $T_{PRS}$ may be measured in terms of the number of subframes between the start of consecutive positioning occasions.

In some aspects, when a UE 105 receives a PRS configuration index $I_{PRS}$ in the assistance data for a particular cell (e.g., a base station), UE 105 may determine the PRS periodicity ($T_{PRS}$) 520 and cell-specific subframe offset ($\Delta_{PRS}$) 515 using stored index data. UE 105 may then

TABLE 2

Examples of parameters for different NR numerologies

| u | SCS (kHz) | Symbols/Sot | Slots/Subframe | Slots/Frame | Slot Duration (ms) | Symbol Duration (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

FIG. 5 illustrates an example of a radio frame sequence 500 with PRS positioning occasions. As used herein, a "PRS instance" or "PRS occasion" refers to an instance of a periodically repeated time window (e.g., a group of one or more consecutive slots) where PRS resources (explained in more detail below) are expected to be transmitted. A PRS instance or occasion may also be referred to as a "PRS positioning occasion," a "PRS positioning instance," a "positioning occasion," "a positioning instance," a "positioning repetition," or simply an "occasion," an "instance," or a "repetition." Radio frame sequence 500 may be applicable to the broadcast of downlink (DL) PRS from base stations 120 in positioning system 100. Radio frame sequence 500 may be used in 5G NR (e.g., in 5G NR determine the radio frame, subframe, and slot when a PRS is scheduled in the cell. The assistance data may be determined by, for example, a location server (e.g., location server 160 in FIG. 1 and/or LMF 220 in FIG. 2), and may include assistance data for a reference cell and a number of neighbor cells supported by various wireless nodes.

With reference to the frame structure in FIG. 4, a collection of REs that are arranged in a particular time/frequency pattern and are used for the transmission of PRS is referred to as a "PRS resource." The collection of resource elements can span multiple RBs in the frequency domain and one or more consecutive symbols within a slot in the time domain, inside which pseudo-random quadrature phase shift keying (QPSK) sequences are transmitted from an antenna port of a TRP. In a given OFDM symbol in the time domain, a PRS resource may occupy consecutive RBs in the frequency domain. The transmission of a PRS resource within a given RB may have a particular comb size (also referred to as the "comb density"). A comb size "N" (e.g., 1, 2, 4, 6, or 12) represents the subcarrier spacing (or frequency/tone spacing) for each symbol of M (e.g., 1, 2, 4, 6, or 12) symbols of a PRS resource configuration, where the configuration uses every Nth subcarrier for PRS symbols of an RB. For example, in a pattern of comb-4 with 4 symbols, for each of the 4 continuous symbols in the PRS resource configuration, REs corresponding to every fourth subcarrier (e.g., subcarriers 0, 4, and 8) are used to transmit the PRS signals.

In LTE, the PRS signals are mapped in diagonal patterns with shifts in frequency and time domain to avoid collision with CRS and other control and data channels. The LTE PRS signals are generally transmitted on antenna port 6 with an SCS of 15 KHz. One or more positioning subframes with CRS and PRS REs may be transmitted in a PRS instance as described above. The positioning subframes are designed to have low interference with the transmission on data channels. Thus, in LTE, the positioning subframes may be dedicated for positioning and would not include data in unused resource elements.

Figure 6A:
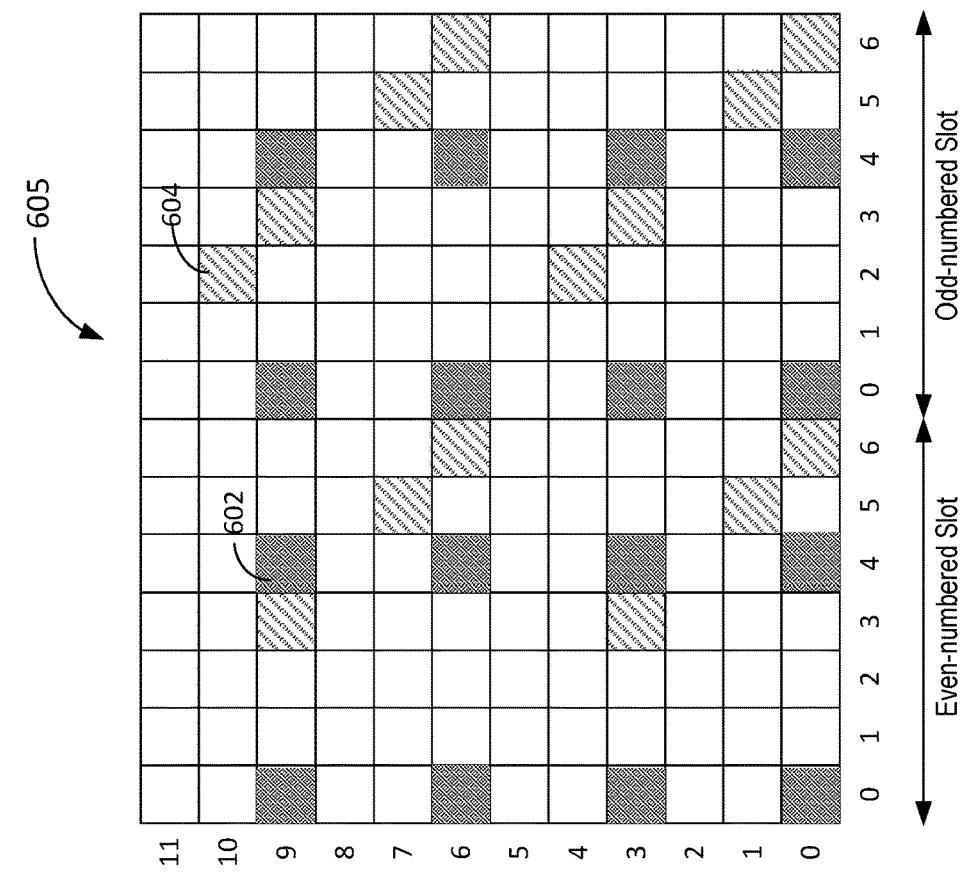
FIGS. 6A and 6B illustrate examples of mapping long-term evolution (LTE) PRS signals to resource elements in a subframe.
Figure 6B:
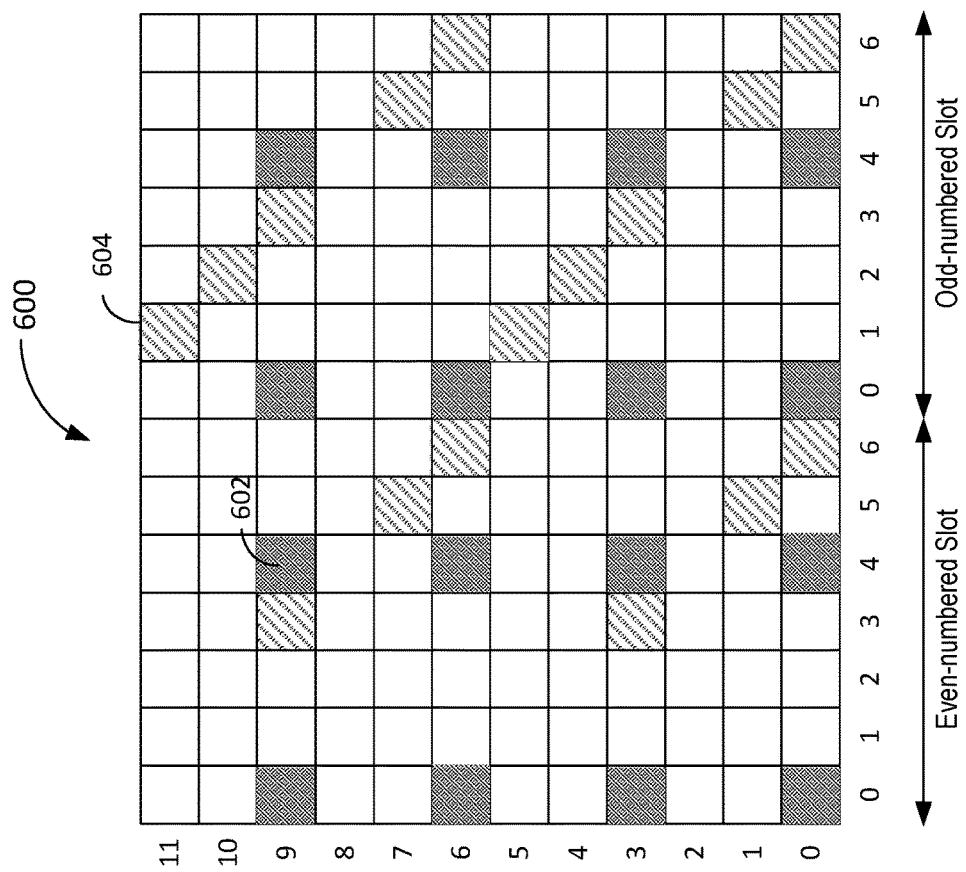

FIGS. 6A-6B illustrates examples of mapping LTE PRS signals to resource elements in a subframe. FIG. 6A shows the mapping of PRS to resource elements in a subframe 600 for normal cyclic prefix and one or two transmit antenna ports. FIG. 6B shows the mapping of PRS to resource elements in a subframe 605 for normal cyclic prefix and four transmit antenna ports. In the illustrated examples, the subframe may include an even-numbered slot and an odd-numbered slot, each with 7 symbols. Each resource element has a frequency-domain (vertical axis) index and a time-domain (horizontal axis) index. The first three symbols in the block of 12 subcarriers over 14 symbols may be used for control channels, such as physical downlink control channel (PDCCH). LTE CRS REs are mapped to REs 602. REs 604 correspond to LTE PRS REs. PRS signals may be mapped to 7 or 8 symbols in each positioning subframe.

In 5G NR, a PRS resource may be transmitted in a resource block having a certain pattern. A DL-PRS resource may span, for example, 1, 2, 4, 6, or 12 consecutive symbols within a slot with a frequency-domain staggered pattern. There may be a constant energy per resource element (EPRE) for all REs of a given DL-PRS resource. Table 3 shows the REs used to transmit DL-PRS resource in an RB having a comb size of 2, 4, 6, or 12 over 2, 4, 6, or 12 symbols, where { . . . } represents the subcarriers used for the REs or symbols. For example, a 6-symbol PRS pattern {0, 3, 1, 4, 2, 5} indicates that the first symbol is transmitted in subcarrier 0, the second symbol is transmitted in subcarrier 3, the third symbol is transmitted in subcarrier 1, the fourth symbol is transmitted in subcarrier 4, the fifth symbol is transmitted in subcarrier 2, and the sixth symbol is transmitted in subcarrier 5. In some embodiments, the PRS REs may be arranged in a comb-1 pattern, such as a comb-1 1-symbol pattern.

TABLE 3

Examples of PRS patterns in a resource block

| Comb | 2 Symbols | 4 Symbols | 6 Symbols | 12 Symbols |
|---|---|---|---|---|
| 2 | {0, 1} | {0, 1, 0, 1} | {0, 1, 0, 1, 0, 1} | {0, 1, 0, 1, 0, 1, 0, 1, 0, 1, 0, 1} |
| 4 | NA | {0, 2, 1, 3} | NA | {0, 2, 1, 3, 0, 2, 1, 3, 0, 2, 1, 3} |
| 6 | NA | NA | {0, 3, 1, 4, 2, 5} | {0, 3, 1, 4, 2, 5, 0, 3, 1, 4, 2, 5} |
| 12 | NA | NA | NA | {0, 6, 3, 9, 1, 7, 4, 10, 2, 8, 5, 11} |

FIGS. 7A-7H show examples of mapping 5G NR downlink (DL) PRS signals to resource elements in a resource block. The illustrated PRS patterns correspond to various PRS patterns shown in Table 3 above. Specifically, FIG. 7A illustrates an example of a comb-2 PRS pattern with two symbols, where two continuous symbols have REs used for PRS signals and the REs for PRS occupy every other subcarrier in each symbol. FIG. 7B illustrates an example of a comb-4 PRS pattern with four symbols, where four continuous symbols may have REs for PRS signals and the REs for PRS signals occupy every fourth subcarrier in each symbol. FIG. 7C illustrates an example of a comb-2 PRS pattern with 12 symbols, where twelve continuous symbols have REs for PRS signals and the REs for PRS signals occupy every other subcarrier in each symbol. FIG. 7D illustrates an example of a comb-4 PRS pattern with 12 symbols, where 12 continuous symbols have REs for PRS signals and the REs for PRS signals occupy every fourth subcarrier in each symbol. FIG. 7E illustrates an example of a comb-6 PRS pattern with 6 symbols, where six continuous symbols have REs for PRS signals and the REs for PRS signals occupy every sixth subcarrier in each symbol. FIG. 7F illustrates an example of a comb-12 PRS pattern with 12 symbols, where 12 continuous symbols have REs for PRS signals and the REs for PRS signals occupy every 12th subcarrier in each symbol. FIG. 7G illustrates an example of a comb-2 PRS pattern with 6 symbols, where six continuous symbols have REs for PRS signals and the REs for PRS signals occupy every other subcarrier in each symbol. FIG. 7H illustrates an example of a comb-6 PRS pattern with 12 symbols, where 12 continuous symbols have REs for PRS signals and the REs for PRS signals occupy every sixth subcarrier in each symbol.

In 5G NR positioning system 200 illustrated in FIG. 2, a TRP (e.g., gNBs 210, ng-eNB 214, or WLAN 216) may transmit frames or other physical layer signaling sequences, supporting PRS signals (i.e., a DL PRS) according to frame configurations described above. The PRS signals may be measured and used for positioning of UE 105. It is noted that other types of wireless network nodes, including other UEs, may also be configured to transmit PRS signals configured in a manner similar to (or the same as) the manner described above. Because the transmission of the PRS signal by a wireless network node may be directed to all UEs within a radio range, the wireless network node may be considered to broadcast a PRS signal. As described above, PRS signal can be used, for example, to perform the TDOA, AOD, and RTT-based positioning techniques.

Figure 8A:
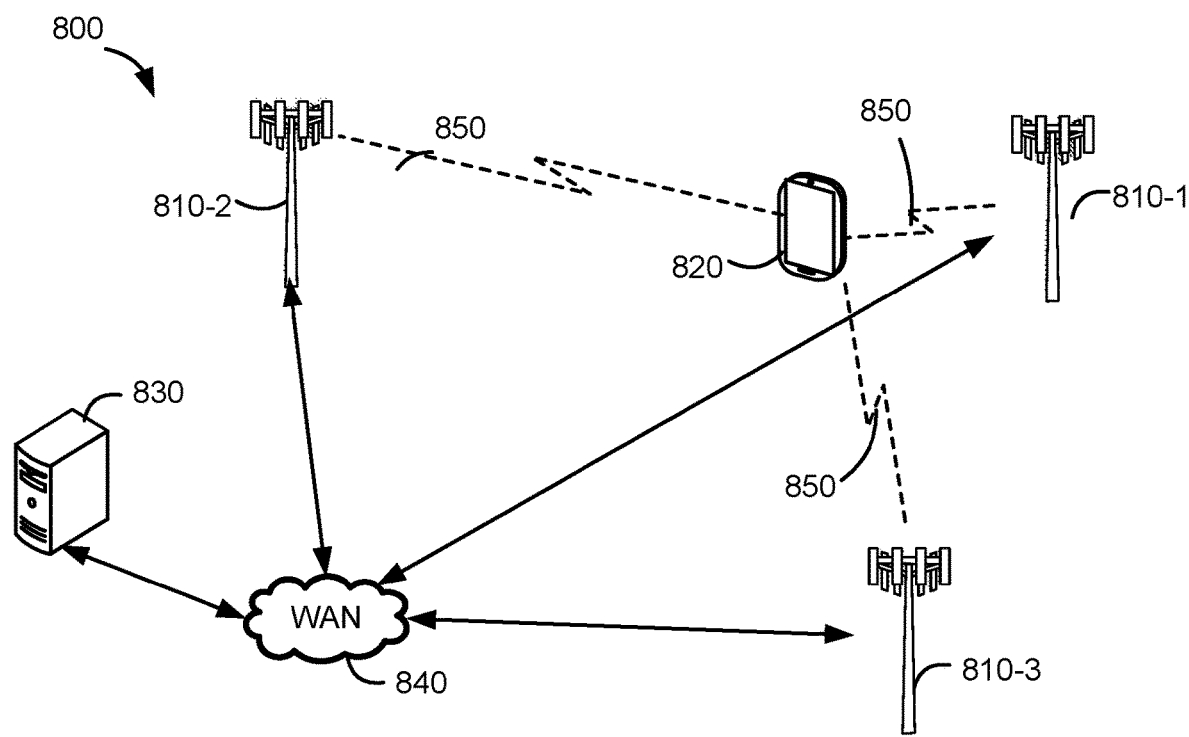
FIG. 8A illustrates an example of user equipment (UE) positioning using multiple base stations and a location server in a terrestrial positioning system.

FIG. 8A illustrates an example of a terrestrial positioning system 800 including multiple TRPs 810-1, 810-2, 801-3, and the like (collectively TRPs 810) and a location server 830 as described above with respect to FIGS. 1 and 2. Terrestrial positioning system 800 may use DL-PRS signals for UE positioning. Each TRP 810-1, 810-2, 801-3, or the like may transmit wireless signals 850 that may include PRS signals to a UE 820. Location server 830 may communicate with TRPs 810 through a WAN 840. Location server 830 may also communicate with UE 820 through a serving TRP (e.g., TRP 810-1). Location server 830 may collect capability data from UEs and send assistance data to UEs. Without the knowledge of when the PRS signals are expected to arrive at UE 820 and without the knowledge of the specific PRS configuration, UE 820 may not be able to perform the RSTD measurements. To enable the RSTD measurements, a location server may transmit OTDOA assistance data to UE 820. The OTDOA assistance data may include reference cell information and neighbor cell information. The reference cell information may include, for example, the physical cell ID, antenna port configuration, PRS configuration, and the like of the reference cell (e.g., the serving cell). The neighbor cell information may include, for example, the physical cell ID, PRS configuration, antenna port configuration, slot number offset, PRS subframe offset, expected RSTD, expected RSTD uncertainty, and the like of a neighbor cell. The PRS configuration may include, for example, PRS bandwidth, PRS configuration index ($I_{PRS}$), number of PRS DL frames, and muting information.

Location server 830 may predict the RSTD value UE 820 is expected to measure for a neighbor cell. For example, location server 830 may know an approximate a-priori location of UE 820 based on, for example, cell ID positioning. Based on this location, neighbor cell candidates for RSTD measurement may be selected. With the a-priori UE location and the location of each candidate neighbor TRP, location server 830 may calculate the distance between the a-priori UE location and each candidate neighbor TRP and thus the expected RSTD.

For OTDOA positioning, the TRPs are generally synchronized. In order to exploit the high detection capability of the PRS, the PRS occasions for all TRPs on a frequency layer may need to be aligned in time. TRPs on the same frequency layer may have the same number of PRS subframes $N_{PRS}$ in each positioning occasion and the same PRS periodicity $T_{PRS}$, and may transmit PRS subframes at the same time. Otherwise, a strong TRP (e.g., the serving TRP) may potentially overpower the PRS signals of a neighbor TRPs with other channels, such as the PDSCH channel.

Figure 8B:
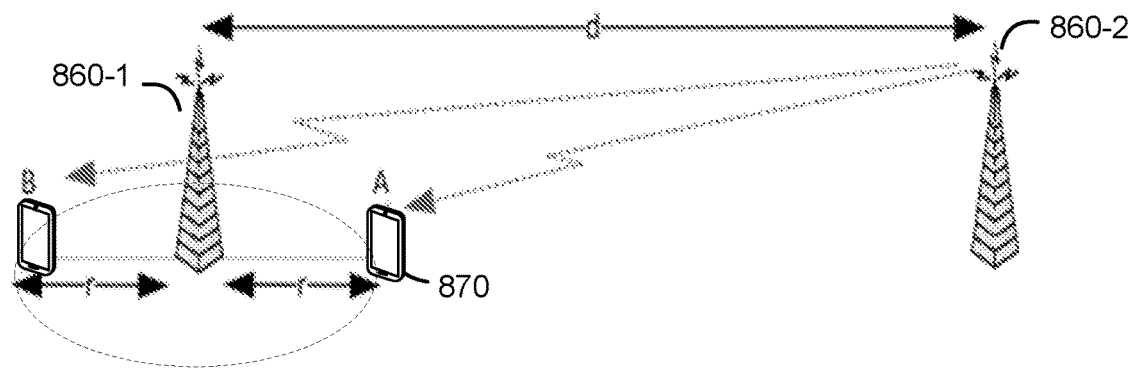
FIG. 8B illustrates an example of expected reference signal time difference (RSTD) and the expected RSTD uncertainty between two transmission reception points (TRPs) at a UE.

FIG. 8B illustrates an example of an expected RSTD and an expected RSTD uncertainty between two TRPs at a UE 870. The illustrated example includes a reference TRP 860-1 and a neighbor TRP 860-2. FIG. 8B also shows two possible UE locations A and B, the closest and furthest respectively with respect to neighbor TRP 860-2. The PRS signals transmitted by reference TRP 860-1 at time t may arrive at locations A and B at t+r/c, where c is the speed of the radio waves and r is the distance between TRP 860-1 and UE 870. PRS signals may also be transmitted by neighbor TRP 860-2 at time t and may be received at locations A and B at t+(d−r)/c and t+(d+r)/c, respectively. Therefore, the RSTD of neighbor TRP 860-2 with respect to reference TRP 860-1 at locations A and B may be (d−2r)/c and d/c, respectively. If reference TRP 860-1 is the serving TRP, r/c may be known via the time advance, or may be estimated based on the maximum cell radius of reference TRP 860-1. Therefore, the PRS signals from neighbor TRP 860-2 may arrive at UE 870 within a time window [−r/c, r/c] centered at (d−r)/c. The center of the time window may be referred to as the expected RSTD and the size of the time window may be referred to as the expected RSTD uncertainty. In LTE, the resolution of the expected RSTD and the expected RSTD uncertainty is about 3×Ts, where Ts=1/(15000×2048) seconds (i.e., about 32 ns). The range of the expected RSTD may be within about [−500, 500] μs.

UE 870 may search the beginning of a PRS occasion of neighbor TRP 860-2 within the time window (referred to as the search window). Table 4 shows the range of the expected RSTD, uncertainty, and number of symbol with the search window for different NR numerologies.

TABLE 4

Parameters of PRS occasion searching for different NR numerologies

| Parameter | Numerology (u) | | | | |
|---|---|---|---|---|---|
| | 0 (LTE) | 1 | 2 | 3 | 4 |
| Subcarrier Spacing (KHz) | 15 | 30 | 60 | 120 | 240 |
| OFDM Symbol Duration (μs) | 66.67 | 33.3 | 16.67 | 8.33 | 4.17 |
| Cyclic Prefix Duration (μs) | 4.69 | 2.34 | 1.17 | 0.57 | 0.29 |
| OFDM Symbol including CP (μs) | 71.35 | 35.7 | 17.84 | 8.92 | 4.46 |
| Expected RSTD (μs) max | 500 | 500 | 500 | 500 | 500 |
| Expected Uncertainty (μs) (max) | 32 | 32 | 32 | 8 | 8 |
| Maximum number of symbols within search space RSTD = max, uncertainty = max | 7 | 15 | 30 | 57 | 114 |

Figure 9:
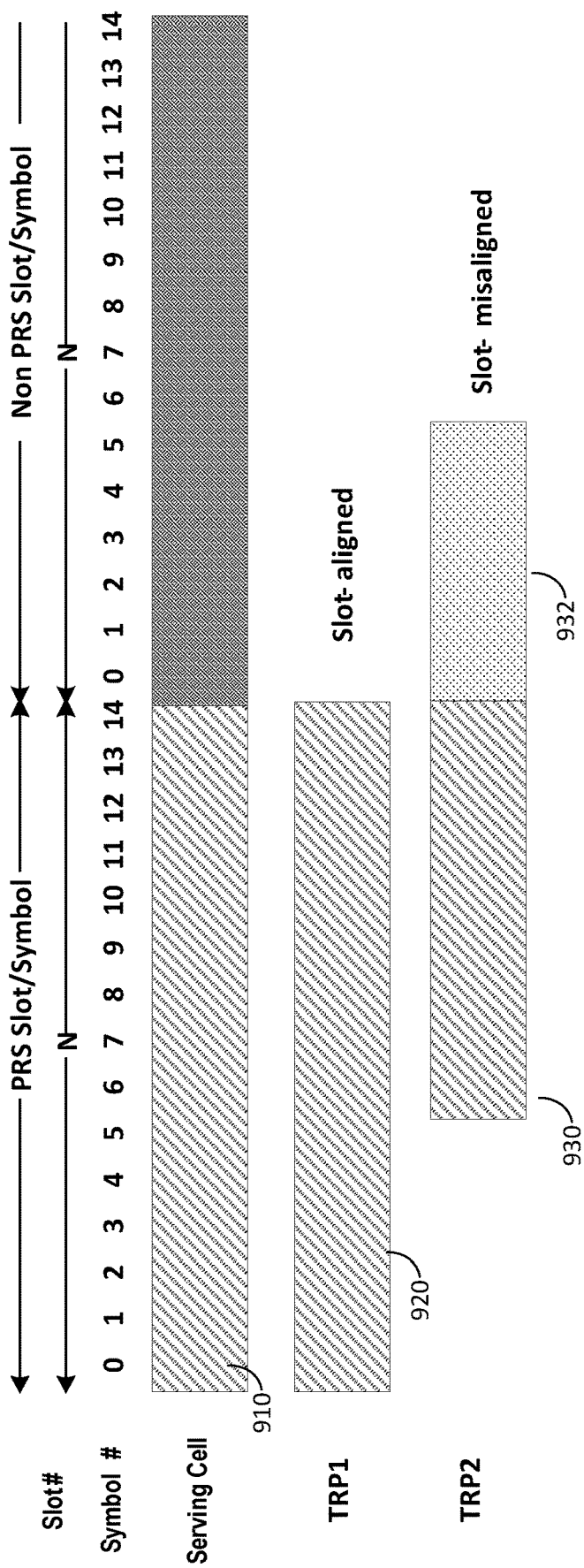
FIG. 9 illustrates an example of slot/symbol misalignment between PRS signals from different TRPs.

FIG. 9 illustrates an example of slot/symbol misalignment between PRS signals from different TRPs. The misalignment may be due to the non-zero RSTD between the TRPs. In the illustrated example, a UE may receive signals 910, 920, and 930 from a serving cell, TRP 1, and TRP 2, respectively. TRP 1 may be co-located with the serving cell or may have the same distance from the UE as the serving cell. Therefore, at the UE, the PRS slot (for LTE) or PRS symbols (for NR) of TRP 1 and the PRS slot (for LTE) or PRS symbols (for NR) of the serving cell may arrive the UE at the same time and end at the same time. Therefore, the PRS slot (or symbols) of TRP 1 and the PRS slot (or symbols) of the serving cell are aligned. As a result, there may be no overlap between the PRS slot (or subframe or symbols) from TRP 1 and the non-PRS slot (or subframe or symbols) from the serving cell.

At the UE, the PRS slot (or symbols) of TRP 2 may arrive later than the PRS slot (or symbols) of the serving cell and thus may also end later than the PRS slot (or symbols) of the serving cell. Therefore, the PRS slot (or symbols) from TRP 2 and the PRS slot (or symbols) from the serving cell may not be fully aligned. As a result, there may be at least a partial overlap between the PRS slot (or subframe or symbols) from TRP 2 and the non-PRS slot (or subframe or symbols) from the serving cell as illustrated by a portion 932 of the PRS slot (or symbols) of TRP 2.

The slot misalignment between the PRS slot of TRP 2 and the PRS slot of the serving cell as shown in FIG. 9 may result in the collision (e.g., interference) between the PRS symbols in the PRS slot (or subframe) of TRP 2 and the non-PRS symbols in the slot (or subframe) of the serving cell. This collision may reduce the SNR and thus the detectability of the PRS signals from TRP 2 by the UE because the power of the signals from the serving cell is generally much higher than the power of the signals from the neighbor cells due to a shorter distance between the UE and the serving cell. The loss in SNR may be a function of the power of the non-PRS symbols of the serving cell, and may reduce the accuracy of the time of arrival (TOA) estimation for PRS signals from TRP 2.

Figure 10A:
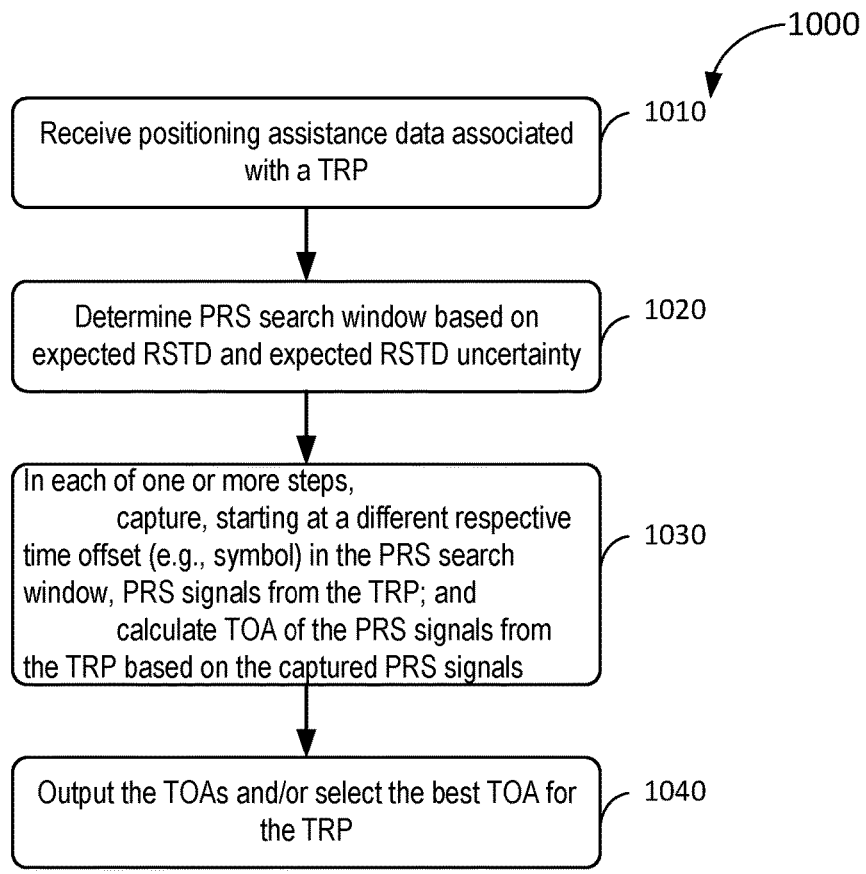
FIG. 10A includes a flowchart illustrating a method of time of arrival (TOA) measurement based on PRS signals according to certain embodiments.

FIG. 10A includes a flowchart 1000 illustrating an example of a method of TOA measurement based on PRS signals. At block 1010, a UE may receive positioning assistance data associated with a TRP from, for example, a location server. As described above, the positioning assistance data may include neighbor cell information, such as the physical cell ID, PRS configuration, antenna port configuration, slot number offset, PRS subframe offset, expected RSTD, expected RSTD uncertainty, and the like. The PRS configuration may include, for example, PRS bandwidth, PRS configuration index ($I_{PRS}$), number of PRS DL frames, and muting information.

Figure 10B:
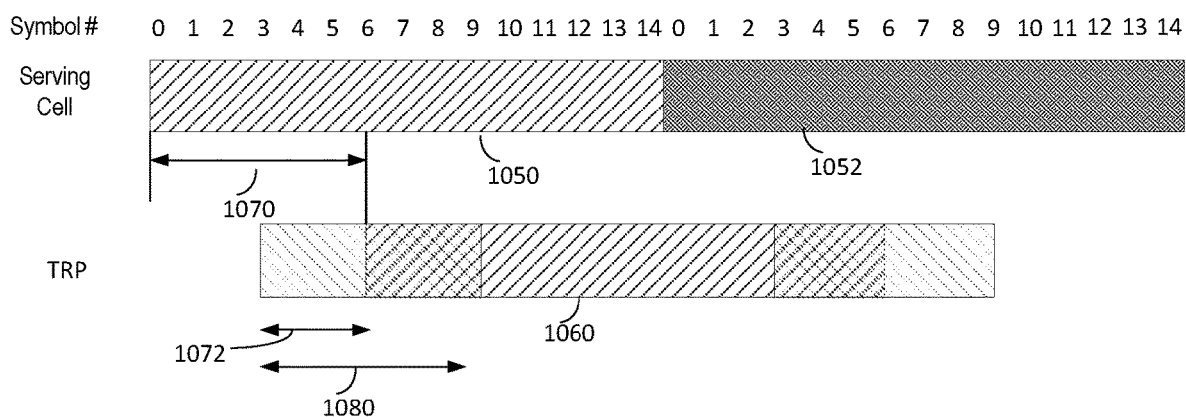
FIG. 10B illustrates an example of a search window for searching PRS signals from a TRP.

At block 1020, the UE may determine a PRS search window for the TRP based on the expected RSTD and the expected RSTD uncertainty associated with the TRP. FIG. 10B illustrates an example of a search window for searching the PRS signals from a TRP. FIG. 10B shows a PRS occasion 1050 from a serving cell and a PRS occasion 1060 from a TRP. PRS occasion 1050 may include one or more PRS slots and symbols, followed by non-PRS slots or symbols 1052. The UE may receive assistance data indicating an expected RSTD 1070 and an expected RSTD uncertainty 1072 for the TRP, and may determine a search window 1080 that is centered around a symbol (e.g., symbol 6) corresponding to the expected RSTD from the starting of PRS occasion 1050 and has a width of about twice the expected RSTD uncertainty 1072 (e.g., 7 symbols from symbol 3 to symbol 9).

At block 1030, the UE may capture the PRS signals and calculate a set of candidate TOAs. For example, in each of one or more steps, the UE may capture PRS signals between a different respective starting symbol (e.g., symbol 3, 4, 5, 6, 7, 8, or 9 in the search window shown in FIG. 10B) and a different respective ending symbol as shown in FIG. 10B to try to capture PRS signals in all PRS symbols of PRS occasion 1060 from the TRP. The captured signals in all PRS symbols may then be processed (e.g., by performing cross-correlation with a locally generated PRS, FFT/IFFT, and SNR estimation) to determine one or more candidate TOAs of PRS occasion 1060 based on the SNR and the peaks of the processed signals. For example, if the SNR of the processed signals (e.g., correlation signals) is below a threshold in a step, the detection may fail. If the SNR of the processed signals is above a threshold, the detection may be successful, and one or more TOAs (e.g., corresponding to one or more paths of a multi-path channel) may be determined from the processed signals (e.g., correlation signals) based on the significant peaks (e.g., correlation peaks) in the processed signals. The smallest TOA corresponding to the shortest path (e.g., the line-of-sight (LOS) path) may be selected as the TOA for the TRP.

At block 1040, the best (e.g., smallest) TOA may be selected from the set of TOAs successful detected and calculated in the one or more steps in block 1030 and sent to the location server. In some embodiments, the set of TOAs determined in block 1030 may be reported to the location server. The location server may determine the location of the UE based on the TOAs or RSTDs for a set of neighbor TRPs determined by the UE.

Due to the collision between the PRS symbols from a TRP and the non-PRS symbols from the serving cell shown in FIGS. 9 and 10B, the SNR of the processed signals may be degraded if all PRS symbols from the TRP are used to estimate the SNR and determine the TOA.

As shown in the examples of FIGS. 6A and 6B, in LTE, a whole subframe may be used for the PRS signals. Therefore, the PRS slot misalignment may have a lower impact on the SNR as the overlapped portion may be a small portion of the overall PRS signals. In addition, in LTE, the positioning accuracy requirement may be low. Therefore, the PRS slot misalignment in LTE may have a lower impact on the UE positioning. In contrast, in 5G NR, the PRS signals may only use a few symbols (e.g., 1, 2, 4, or 6) in a resource block. Thus, a misalignment may cause a large portion or even all of the PRS symbols from the TRP to collide with non-PRS symbols from the reference cells, and thus a large SNR and TOA accuracy degradation. Therefore, with the presence of PRS slot/symbol misalignment, the positioning performance may not achieve the desired level in 5G NR.

Figure 11:
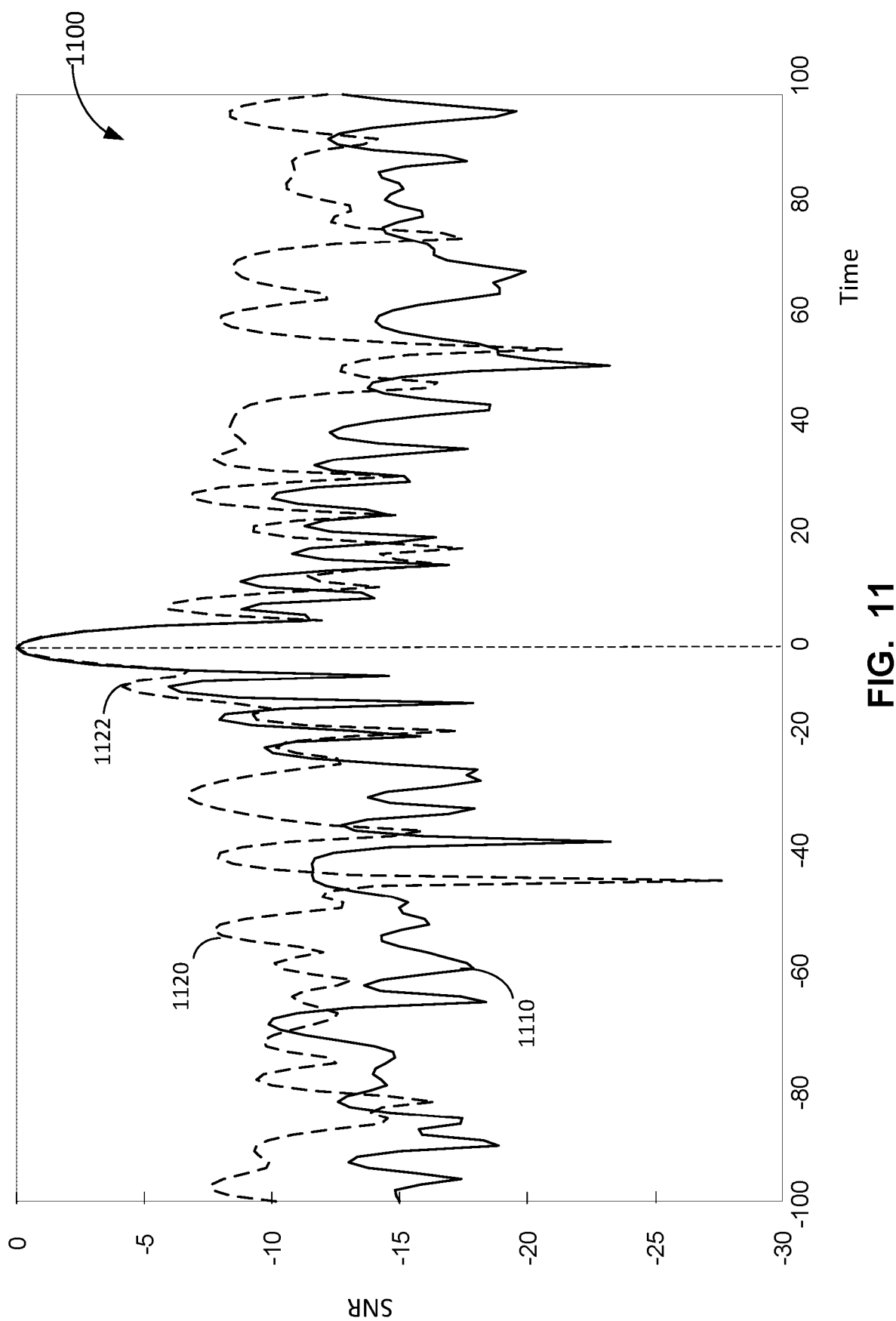
FIG. 11 illustrates examples of simulated 5G PRS signals in a single-path additive white Gaussian noise (AWGN) channel with and without signal-to-noise ratio (SNR) degradation caused by PRS symbol misalignment.

FIG. 11 is a diagram 1100 illustrating examples of simulated 5G PRS signals in a single-path additive white Gaussian noise (AWGN) channel with and without SNR degradation caused by the PRS symbol misalignment. In the illustrated example, the PRS subframe has a comb-1 1-symbol pattern where the PRS symbols are in one symbol in each slot. Therefore, a PRS symbol misalignment may cause all PRS symbols from a TRP to collide with no-PRS symbols from a reference cell. Because the power of the PRS REs of the TRP may be much lower than the power of the no-PRS (e.g., PDSCH) REs of the serving cell, the interference from the non-PRS signals of the serving cell may be significant.

In FIG. 11, a curve 1110 shows the SNR (in dB) of a portion of the processed PRS signals in the time domain with no interference from non-PRS (e.g., PDSCH) signals of the reference cell. A curve 1120 shows the SNR (in dB) of a portion of the processed PRS signals in the time domain with PRS symbol misalignment and interference from non-PRS signals of the reference cell. Curve 1120 shows a degradation in AWGN SNR of about 5 dB or larger and a significant increase in sidelobe power. The increase in sidelobe power may lead to false detection of TOAs. For example, a sidelobe 1122 may have a sufficiently high power to be incorrectly identified as corresponding to a TOA.

Figure 12:
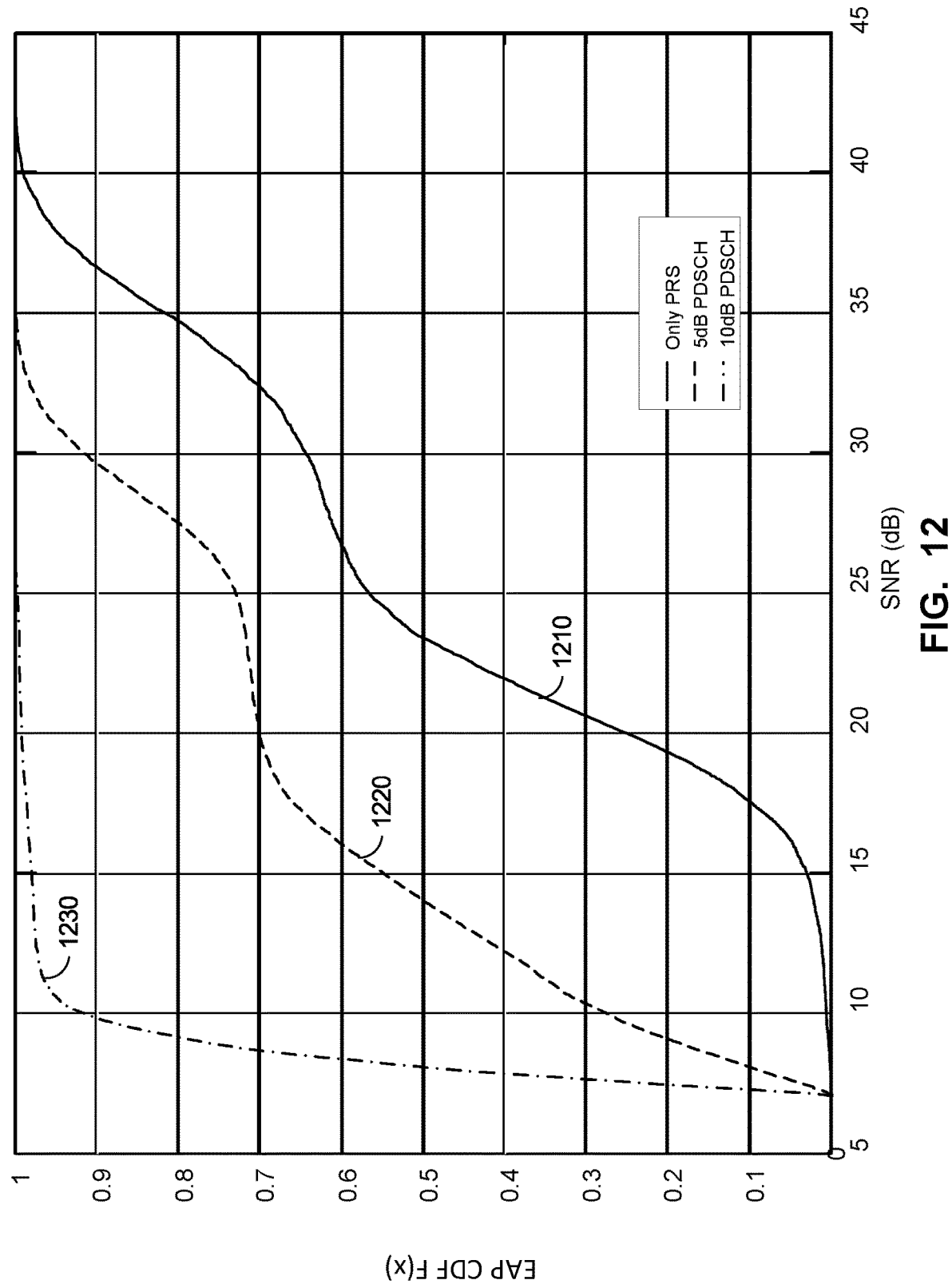
FIG. 12 illustrates examples of simulated cumulative distribution functions (CDF) of earliest arrival peak (EAP) SNR for PRS signals in a multi-path clustered delay line (CDL)-A channel with and without SNR degradation caused by PRS symbol misalignment.

FIG. 12 illustrates examples of simulated cumulative distribution functions (CDFs) of earliest arrival peak (EAP) SNR for PRS signals in a multi-path Clustered Delay Line (CDL)-A channel with and without SNR degradation caused by PRS symbol misalignment. A curve 1210 in FIG. 12 shows the CDF of EAP SNR for 0 dB PRS signals with no interference from non-PRS (e.g., PDSCH) signals. A curve 1220 shows the CDF of EAP SNR for 0 dB PRS signals with interference from 5 dB PDSCH signals. A curve 1230 shows the CDF of EAP SNR for 0 dB PRS signals with interference from 10 dB PDSCH signals. Curves 1210-1230 show that the EAP SNR decreases with the increase of the power of the PDSCH signals, and the probability that the SNR is below a certain value increases with the increase of the power of the PDSCH signals.

Figure 13:
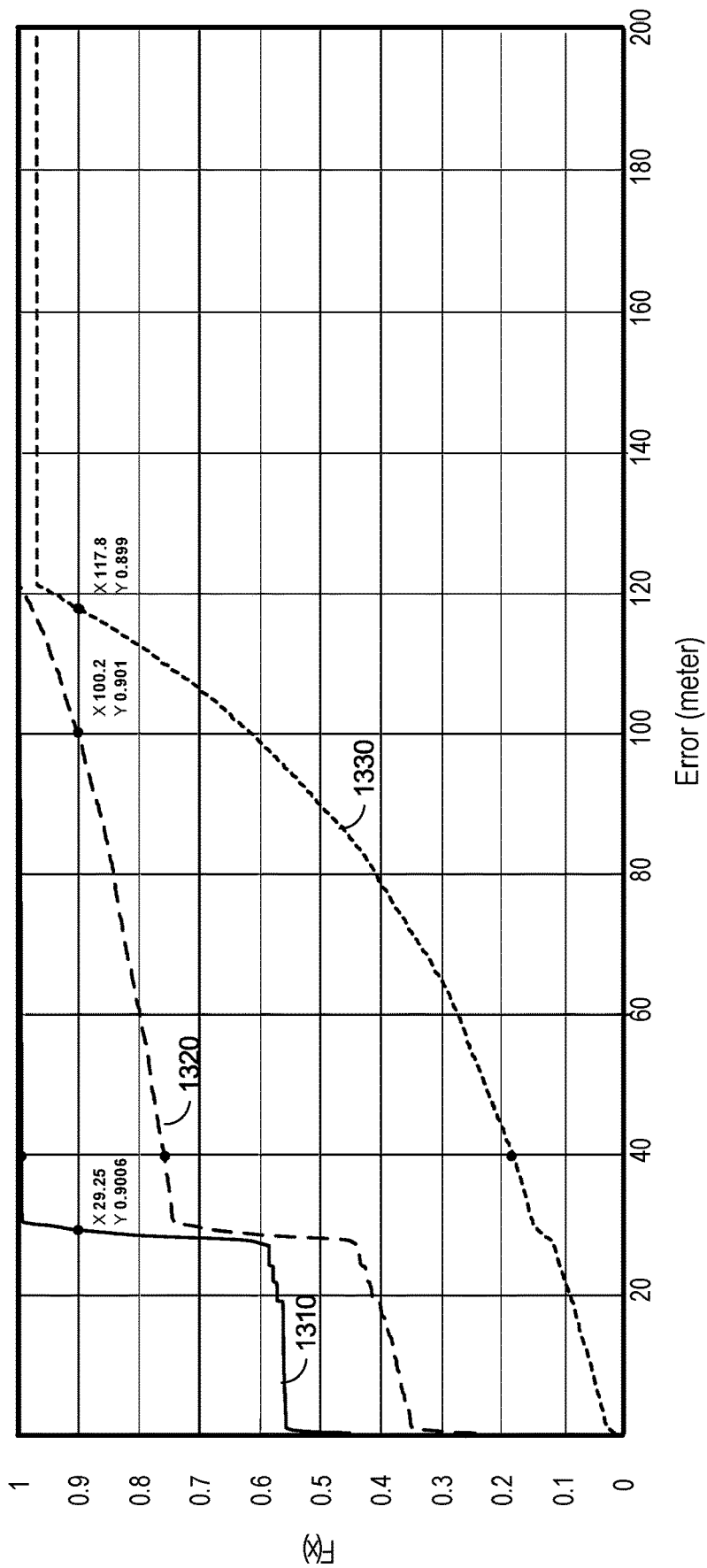
FIG. 13 illustrates examples of CDF of peak errors for PRS signals in a multi-path CDL-A channel with and without SNR degradation caused by PRS symbol misalignment.

FIG. 13 illustrates examples of cumulative distribution functions (CDFs) of peak errors for PRS signals in a multi-path CDL-A channel with and without SNR degradation caused by PRS symbol misalignment. A curve 1310 shows the CDF of peak errors for −6 dB PRS signals with no interference from non-PRS (e.g., PDSCH) signals. A curve 1320 shows the CDF of peak errors for −6 dB PRS signals with interference from 5 dB PDSCH signals. A curve 1330 shows the CDF of peak errors for −6 dB PRS signals with interference from 10 dB PDSCH signals. Curves 1310-

1330 show that the TOA error increases with the increase of the power of the PDSCH signal. For example, with no interference from the PDSCH signals, the probability that the measured TOA error is lower than 30 meters may be about 90%. With interference from 5 dB PDSCH signals, the probability that the measured TOA error is lower than about 100 meters is about 90%. With interference from 10 dB PDSCH signals, the probability that the measured TOA error is lower than about 118 meters is about 90%. In another example, with interference from 10 dB PDSCH signals, the probability that the measured TOA error is less than about 40 meters is less than about 20%. With interference from 5 dB PDSCH signals, the probability that the measured TOA error is less than about 40 meters is about 75%. With no interference from the PDSCH signals, the probability that the measured TOA error is less than 40 meters is about 100%.

Thus, to improve the TOA measurement accuracy, it may be desirable to reduce the interference from non-PRS signals and improve the SNR of the PRS signals from TRPs. According to certain embodiments, in order to improve the SNR in the presence of PRS symbol misalignment and thus improve the accuracy of the PRS positioning, the non-colliding PRS symbol(s) may be identified and used to determine the TOA, while the colliding PRS symbols may not be used to determine the TOA. In some embodiments, all PRS symbols in a PRS occasion may be used to determine another TOA, and then a better (e.g., a smaller) TOA may be selected from the TOAs determined with and without using the colliding PRS symbols.

Figure 14:
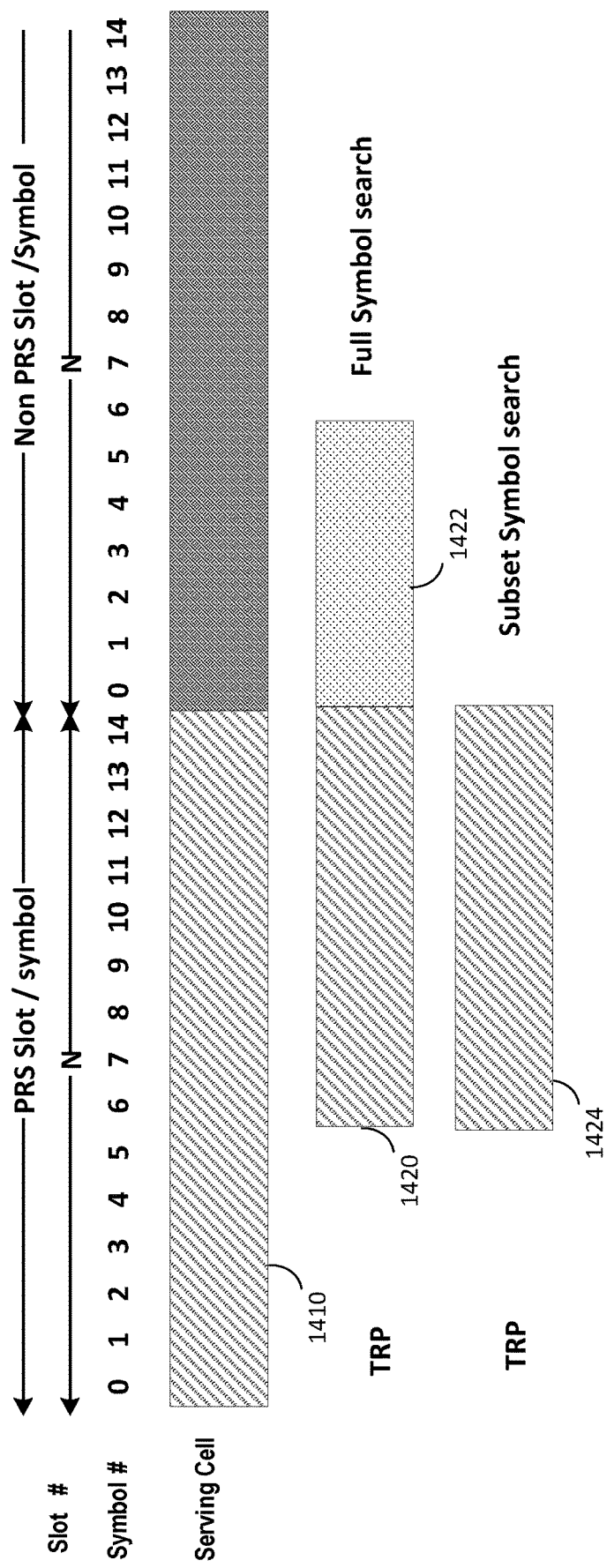
FIG. 14 illustrates an example of a method of improving the SNR of misaligned PRS signals according to certain embodiments.

FIG. 14 illustrates an example of a method of improving the SNR of PRS signals with PRS symbol misalignment according to certain embodiments. In the illustrated example, a UE may receive signals 1410 and 1420 from a serving cell and a TRP, respectively. At the UE, the PRS slot (or symbols) of the TRP may arrive later than the PRS slot (or symbols) of the serving cell and may end later than the PRS slot (or symbols) of the serving cell. Therefore, the PRS slot (or symbols) of the TRP and the PRS slot (or symbols) of the serving cell are not fully aligned. As a result, there may be an overlap between the PRS symbols from the TRP and non-PRS symbols from the serving cell as illustrated by a portion 1422 of the PRS symbols from the TRP. As described above, the non-PRS symbols from the serving cell may include control channels or data and may have a much higher power than the PRS slot or symbols from the TRP. Thus, the non-PRS symbols from the serving cell may interfere with the PRS symbols of the TRP to cause a degradation of the SNR and thus the accuracy of the TOA estimation.

To reduce the effect of the interference of the non-PRS symbols on the TOA measurement, PRS signals may be decoded using only the non-colliding symbol(s) 1424 in the positioning subframe(s). The non-colliding symbols may be continuous as shown in FIG. 14 or may be non-continuous, depending on the scheduling of, for example, PRS, PDCCH, and PDSCH. The non-colliding symbols 1424 may include a subset of PRS symbols of all PRS symbols in a PRS occasion. The PRS search using only the subset of non-colliding PRS symbols may be referred to as subset symbol search/hypothesis. In full symbol search/hypothesis as described above with respect to FIGS. 10A and 10B, all PRS symbols may be used for the PRS decoding. Because the interference from the non-PRS symbols of the serving cell are excluded in the PRS decoding, the subset symbol search/hypothesis can outperform full symbol search/hypothesis.

Figure 15:
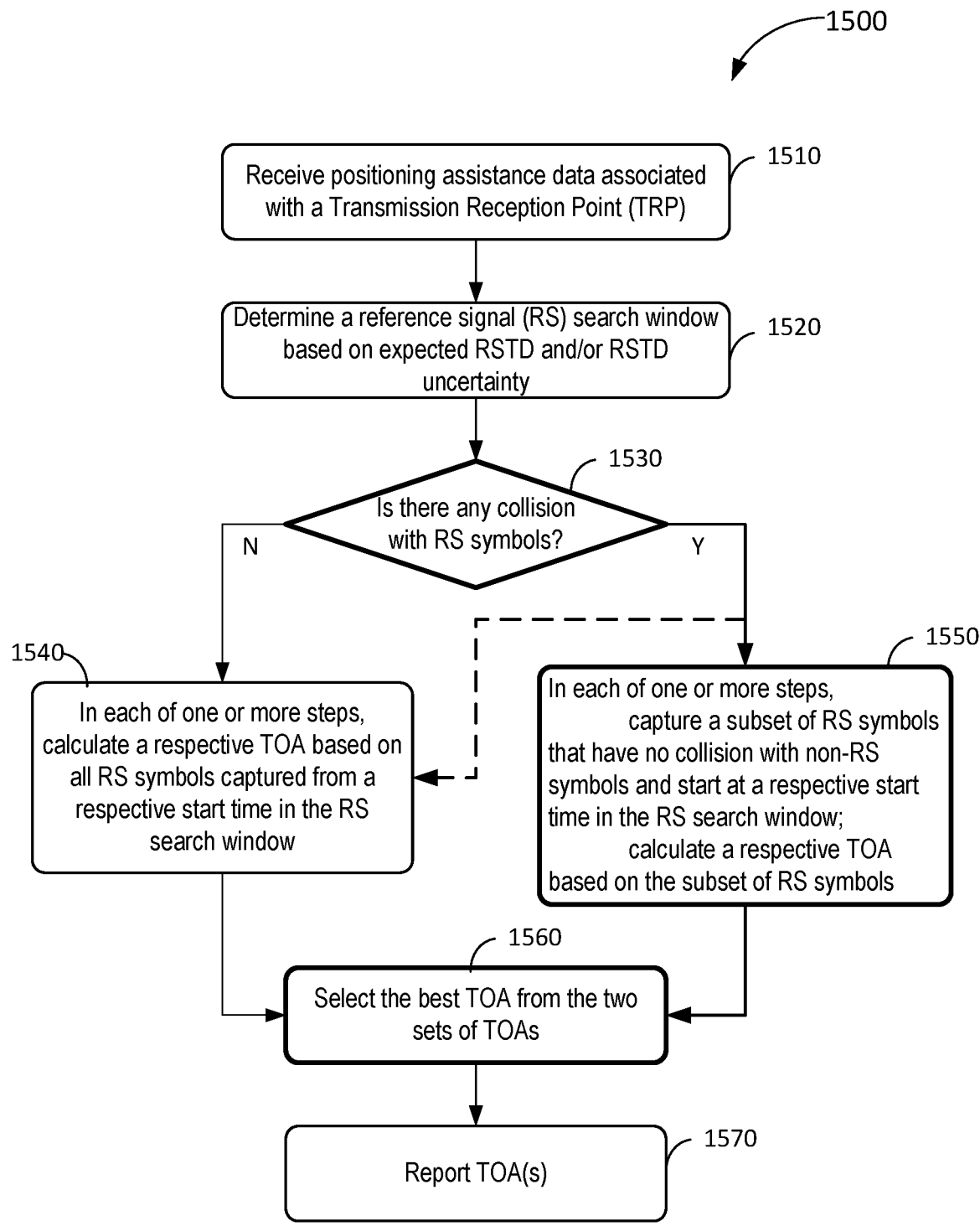
FIG. 15 includes a simplified flowchart illustrating an example of a method of improving SNR of misaligned PRS signals and TOA measurement accuracy according to certain embodiments.
Figure 17:
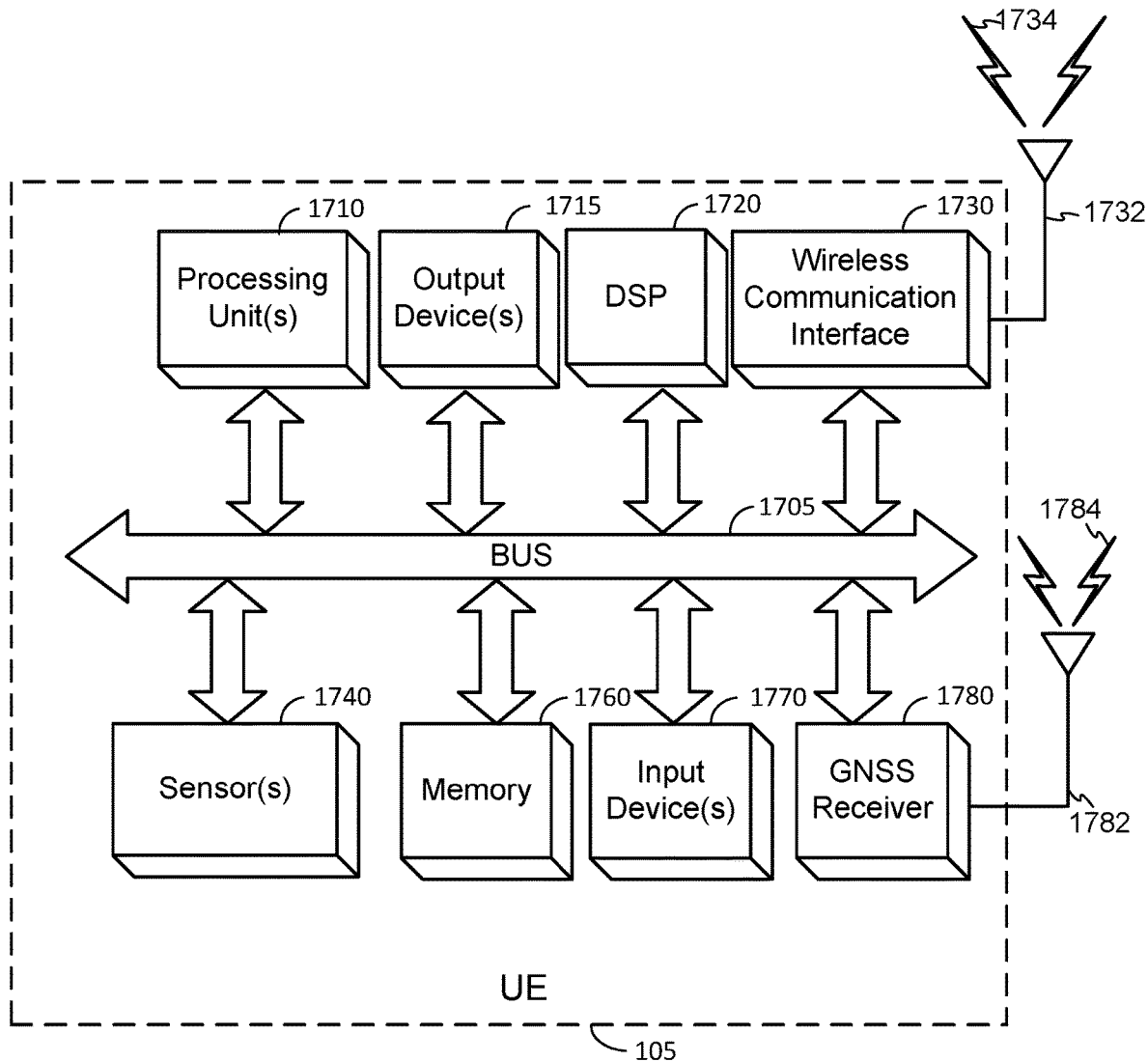
FIG. 17 illustrates an example of a UE according to certain embodiments.

FIG. 15 includes a simplified flowchart 1500 illustrating an example of a method of improving the SNR of PRS signals with PRS symbol misalignment and improving TOA measurement accuracy according to certain embodiments. It is noted that the operations illustrated in FIG. 15 provide particular positioning techniques. Other sequences of operations can also be performed according to alternative embodiments. For example, alternative embodiments may perform the operation in a different order. Moreover, the individual operations illustrated in FIG. 15 can include multiple sub-operations that can be performed in various sequences as appropriate for the individual operation. Furthermore, some operations can be added or removed depending on the particular applications. In some implementations, two or more operations may be performed in parallel. One of ordinary skill in the art would recognize many variations, modifications, and alternatives. In various embodiments, the means for performing the functionality illustrated in flowchart 1500 may include, for example, a UE or a TRP described herein, which may include hardware (e.g., transceivers and processors) and/or software components for performing the described functionality. For example, means for performing the operations in flowchart 1500 may include various components of a UE, such as a wireless communication interface 1730, wireless communication antenna(s) 1732, a bus 1705, a digital signal processor (DSP) 1720, processing unit(s) 1710, memory 1760, and/or other components of a UE 105, as illustrated in FIG. 17 below.

At block 1510, a UE may receive positioning assistance data associated with a TRP from, for example, a location server. As described above, the positioning assistance data may include neighbor cell information, such as the physical cell ID, PRS configuration, antenna port configuration, slot number offset, PRS subframe offset, expected RSTD with respect to a reference cell, expected RSTD uncertainty, and the like for a TRP. The PRS configuration may include, for example, PRS bandwidth, PRS configuration index ($I_{PRs}$), number of PRS DL frames, and muting information. In some embodiments, the reference signals used for the UE positioning may be other reference signals of a RAT, such as navigation reference signals (NRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), or the like.

At block 1520, the UE may determine a reference signal (RS) search window for searching the RS symbols (e.g., PRS symbols) from the TRP based on the expected RSTD associated with the TRP with respect to the reference cell and the expected RSTD uncertainty associated with the TRP. For example, as illustrated in the example shown in FIG. 10B, the search window (e.g., search window 1080) may be centered around a symbol (e.g., symbol 6) having the expected RSTD from the starting of a PRS occasion (e.g., PRS occasion 1050) of the reference cell and may have a width about twice the expected RSTD uncertainty 1072 (e.g., 7 symbols from symbol 3 to symbol 9).

At block 1530, the UE may determine if there is any collision between the reference symbols from the TRP and non-reference symbols from the reference cell, for example, based on the expected RSTD and/or the expected RSTD uncertainty, or based on an RSTD determined in a previous positioning process (e.g., by performing a searching process within the search window or by performing a previous process described in FIG. 15). For example, if the expected RSTD or the previously determined RSTD is not zero, there may be a misalignment between the reference symbols from the TRP and reference symbols from the reference cell, and thus a collision between the reference symbols from the TRP and non-reference symbols from the reference cell. If the expected RSTD is zero but the expected RSTD uncertainty is not zero, it may also be possible that there is a misalignment between the reference symbols from the TRP and reference symbols from the reference cell. If the UE determines at block 1530 that there is no collision between the reference symbols from the TRP and non-reference symbols from the reference cell, the UE may perform operations at block 1540. If the UE determined that there is a collision between the reference symbols from the TRP and non-reference symbols from the reference cell, the UE may perform operations at block 1550. In some embodiments, the UE may perform both the operations at block 1550 and the operations at block 1540.

At block 1540, the UE may, in each of one or more steps, capture the reference signals in all RS symbols from the TRP (e.g., all PRS symbols in a PRS occasion) based on a previously determined RSTD or the search window, and then determine a respective TOA based on all RS symbols captured from a respective start time (e.g., within the RS search window) as described above with respect to, for example, FIG. 10A. Thus, a set of one or more TOAs may be determined at block 1540.

At block 1550, the UE may, in each of one or more steps, capture a subset of RS symbols that start at a respective start time (e.g., within the RS search window) and have no collision with non-RS symbols from the reference cell, and then determine a respective TOA as described above with respect to FIG. 10A, based only on the subset of RS symbols. Thus, a set of one or more TOAs may be determined at block 1550.

In some embodiments, if the UE determines that there is a collision between the reference symbols from the TRP and non-reference symbols from the reference cell, the UE may additionally perform the operations in block 1540 to determine another set of one or more TOAs.

At block 1560, the UE may select a best (e.g., smallest) TOA from the set of one or more TOAs determined at block 1540 or block 1550, or may select a best (e.g., smallest) TOA from the set of one or more TOAs determined at block 1540 and the set of one or more TOAs determined at block 1550. AT block 1570, the UE may report the selected TOA, the set of one or more TOAs determined at block 1540, and/or the set of one or more TOAs determined at block 1550 to a location server.

Figure 16:
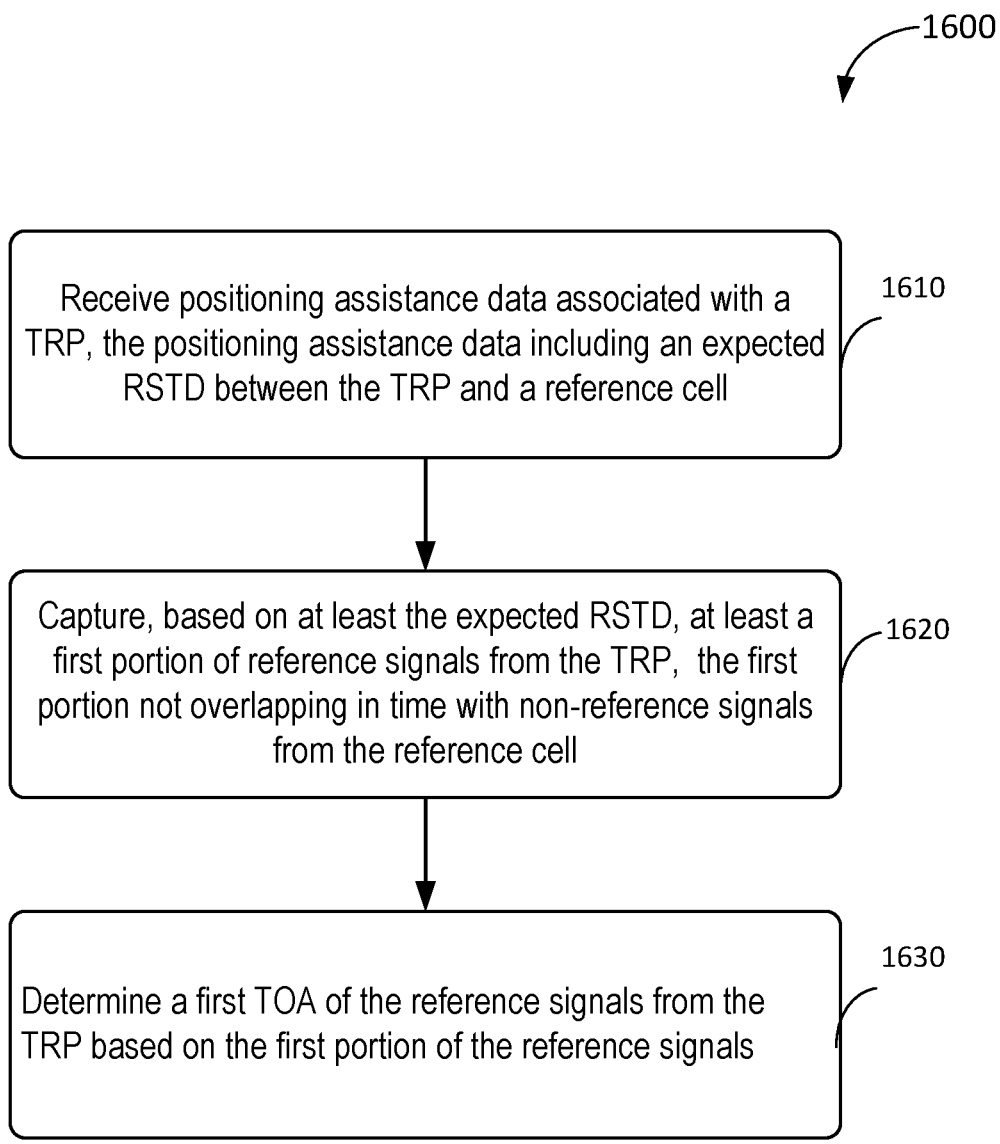
FIG. 16 includes a simplified flowchart illustrating an example of a method of TOA measurement according to certain embodiments.

FIG. 16 includes a simplified flowchart 1600 illustrating an example of a method of TOA measurement according to certain embodiments. It is noted that the operations illustrated in FIG. 16 provide particular positioning techniques. Other sequences of operations can also be performed according to alternative embodiments. For example, alternative embodiments may perform the operation in a different order. Moreover, the individual operations illustrated in FIG. 16 can include multiple sub-operations that can be performed in various sequences as appropriate for the individual operation. Furthermore, some operations can be added or removed depending on the particular applications. In some implementations, two or more operations may be performed in parallel. One of ordinary skill in the art would recognize many variations, modifications, and alternatives. In various embodiments, the means for performing the functionality illustrated in flowchart 1600 may include, for example, a UE or a TRP described herein, which may include hardware (e.g., transceivers and processors) and/or software components for performing the described functionality. For example, means for performing the operations in flowchart 1600 may include various components of a UE, such as a wireless communication interface 1730, wireless communication antenna(s) 1732, a bus 1705, a digital signal processor (DSP) 1720, processing unit(s) 1710, memory 1760, and/or other components of a UE 105, as illustrated in FIG. 17 below.

At block 1610, a UE may receive positioning assistance data associated with a TRP, for example, from a location server. As described above, the positioning assistance data may include neighbor cell information, such as the physical cell ID, PRS configuration, antenna port configuration, slot number offset, PRS subframe offset, expected RSTD with respect to a reference cell, expected RSTD uncertainty, and the like of one or more TRPs. The PRS configuration may include, for example, PRS bandwidth, PRS configuration index ($I_{PRS}$), number of PRS DL frames, and muting information. In some embodiments, the reference signals used for the UE positioning may be other reference signals of a RAT, such as NRS, TRS, PTRS, CRS, CSI-RS, PSS, SSS, SSBs, or the like. The expected RSTD and/or the expected RSTD uncertainty, or an RSTD determined in a previous positioning process may indicate if there is a misalignment at the UE between reference signals from the TRP and reference signals from the reference cell. For example, if the expected RSTD or the previously determined RSTD is not zero, there may be a misalignment between the reference signals of the TRP and the reference signals of the reference cell, and thus a collision between reference symbols from the TRP and non-reference symbols from the reference cell. If the expected RSTD is zero but the expected RSTD uncertainty is not zero, it may also be possible that there is a misalignment between the reference symbols from the TRP and reference symbols from the reference cell.

At block 1620, the UE may capture, based on at least the expected RSTD, a first portion of the reference signals from the TRP, where the first portion of the reference signals may not overlap in time with non-reference signals from the reference cell. For example, as described above, the first portion of the reference signals may be determined based on the expected RSTD or a previously measured RSTD.

At block 1630, the UE may determine a first TOA of the reference signals from the TRP based on the first portion of the reference signals. In some embodiments, the UE may capture both the first portion of the reference signals from the TRP and a second portion of the reference signals from the TRP that may overlap in time with non-reference signals from the reference cell, but may only use the first portion of the reference signals to determine the first TOA. In some embodiments, the UE may send the first TOA to a location server. In some embodiments, the UE may also determine a second TOA of the reference signals from the TRP based on the first portion of the reference signals and the second portion of the reference signals, and select a smaller one of the first TOA and the second TOA as an estimated TOA of the reference signals.

FIG. 17 illustrates an embodiment of a UE 105, which can be utilized as described herein above (e.g., in association with FIGS. 1-16). For example, the UE 105 can perform one or more of the functions of the methods shown in FIGS. 15 and 16. It should be noted that FIG. 17 is meant only to provide a generalized illustration of various components, any or all of which may be utilized as appropriate. It can be noted that, in some instances, components illustrated by FIG. 17 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 17.

The UE 105 is shown comprising hardware elements that can be electrically coupled via a bus 1705 (or may otherwise be in communication, as appropriate). The hardware elements may include a processing unit(s) 1710 which can include without limitation one or more general-purpose processors, one or more special-purpose processors (such as DSP chips, graphics acceleration processors, application specific integrated circuits (ASICs), and/or the like), and/or other processing structures or means. As shown in FIG. 17, some embodiments may have a separate DSP 1720, depending on desired functionality. Location determination and/or other determinations based on wireless communication may be provided in the processing unit(s) 1710 and/or wireless communication interface 1730 (discussed below). The UE 105 also can include one or more input devices 1770, which can include without limitation one or more keyboards, touch screens, touch pads, microphones, buttons, dials, switches, and/or the like; and one or more output devices 1715, which can include without limitation one or more displays (e.g., touch screens), light emitting diodes (LEDs), speakers, and/or the like.

The UE 105 may also include a wireless communication interface 1730, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. As such, the wireless communication interface 1730 can include RF circuitry capable of being tuned between an active BWP and one or additional bands having one or more FLs used for PRS signals, as described herein. The wireless communication interface 1730 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1732 that send and/or receive wireless signals 1734. According to some embodiments, the wireless communication antenna(s) 1732 may comprise a plurality of discrete antennas, antenna arrays, or any combination thereof.

Depending on desired functionality, the wireless communication interface 1730 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project 3" (3GPP2). 3GPP and 3GPP2 documents are publicly available. A WLAN may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1740. Sensors 1740 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 1780 capable of receiving signals 1784 from one or more GNSS satellites using an antenna 1782 (which could be the same as wireless communication antenna 1732). Positioning based on GNSS signal measurement can be utilized to complement and/or incorporate the techniques described herein. The GNSS receiver 1780 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1780 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1780 is illustrated in FIG. 17 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1710, DSP 1720, and/or a processing unit within the wireless communication interface 1730 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1710 or DSP 1720.

The UE 105 may further include and/or be in communication with a memory 1760. The memory 1760 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1760 of the UE 105 also can comprise software elements (not shown in FIG. 17), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1760 that are executable by the UE 105 (and/or processing unit(s) 1710 or DSP 1720 within UE 105). In an aspect, then such code and/or instructions can be used to configure and/or adapt a general-purpose computer (or other device) to perform one or more operations in accordance with the described methods.

Figure 18:
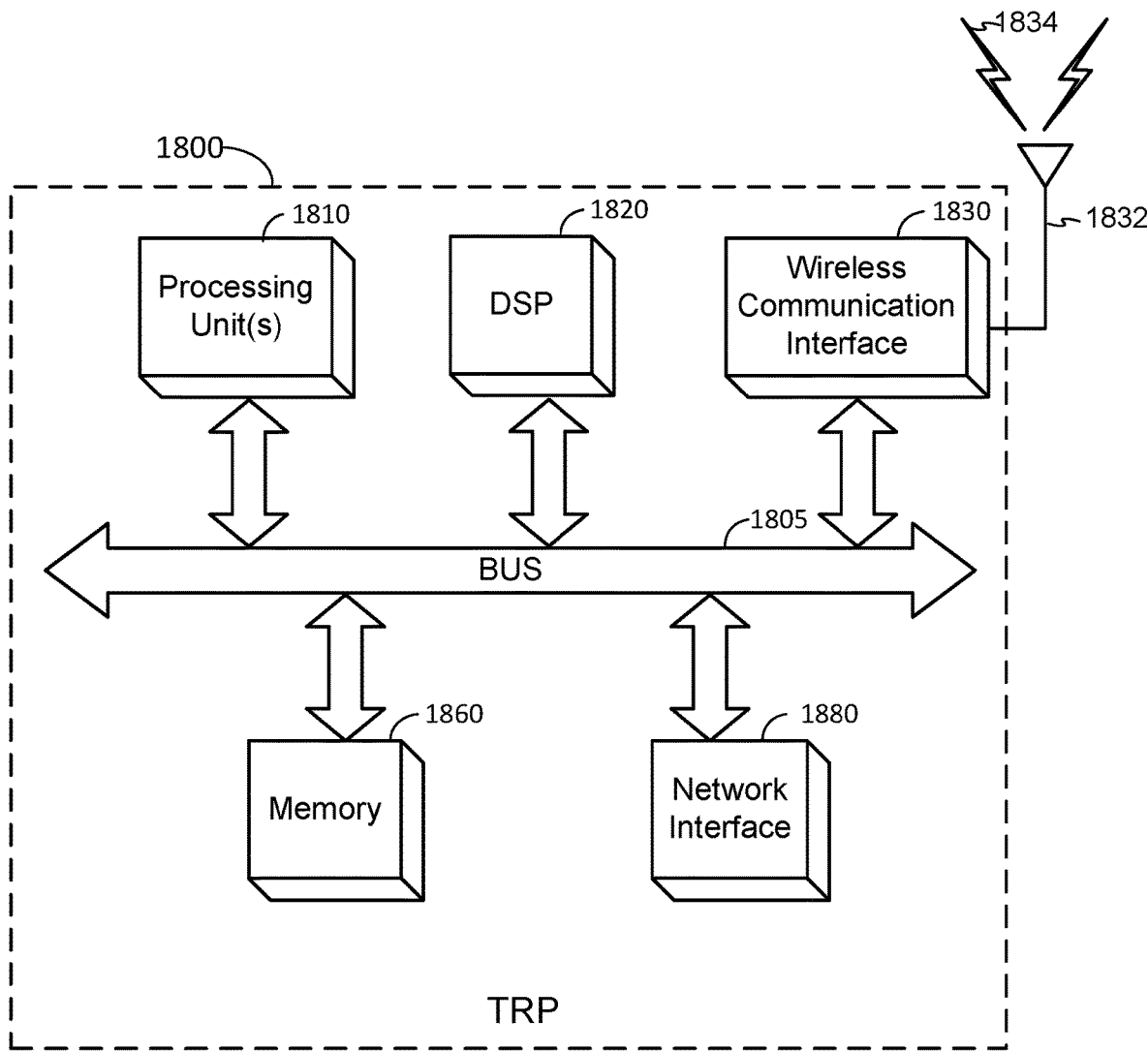
FIG. 18 illustrates an example of a TRP according to certain embodiments.

FIG. 18 illustrates an embodiment of a TRP 1800, which can be utilized as described herein above (e.g., in association with FIGS. 1-16). It should be noted that FIG. 18 is meant only to provide a generalized illustration of various components, any or all of which may be utilized as appropriate.

The TRP 1800 is shown comprising hardware elements that can be electrically coupled via a bus 1805 (or may otherwise be in communication, as appropriate). The hardware elements may include a processing unit(s) 1810 which can include without limitation one or more general-purpose processors, one or more special-purpose processors (such as DSP chips, graphics acceleration processors, ASICs, and/or the like), and/or other processing structure or means. As shown in FIG. 18, some embodiments may have a separate DSP 1820, depending on desired functionality. Location determination and/or other determinations based on wireless communication may be provided in the processing unit(s) 1810 and/or wireless communication interface 1830 (discussed below), according to some embodiments. The TRP 1800 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The TRP 1800 might also include a wireless communication interface 1830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the TRP 1800 to communicate as described herein. The wireless communication interface 1830 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1832 that send and/or receive wireless signals 1834.

The TRP 1800 may also include a network interface 1880, which can include support of wireline communication technologies. The network interface 1880 may include a modem, network card, chipset, and/or the like. The network interface 1880 may include one or more input and/or output communication interfaces to permit data to be exchanged with a network, communication network servers, computer systems, and/or any other electronic devices described herein.

In many embodiments, the TRP 1800 may further comprise a memory 1860. The memory 1860 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1860 of the TRP 1800 also may comprise software elements (not shown in FIG. 18), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1860 that are executable by the TRP 1800 (and/or processing unit(s) 1810 or DSP 1820 within TRP 1800). In an aspect, then such code and/or instructions can be used to configure and/or adapt a general-purpose computer (or other device) to perform one or more operations in accordance with the described methods.

Figure 19:
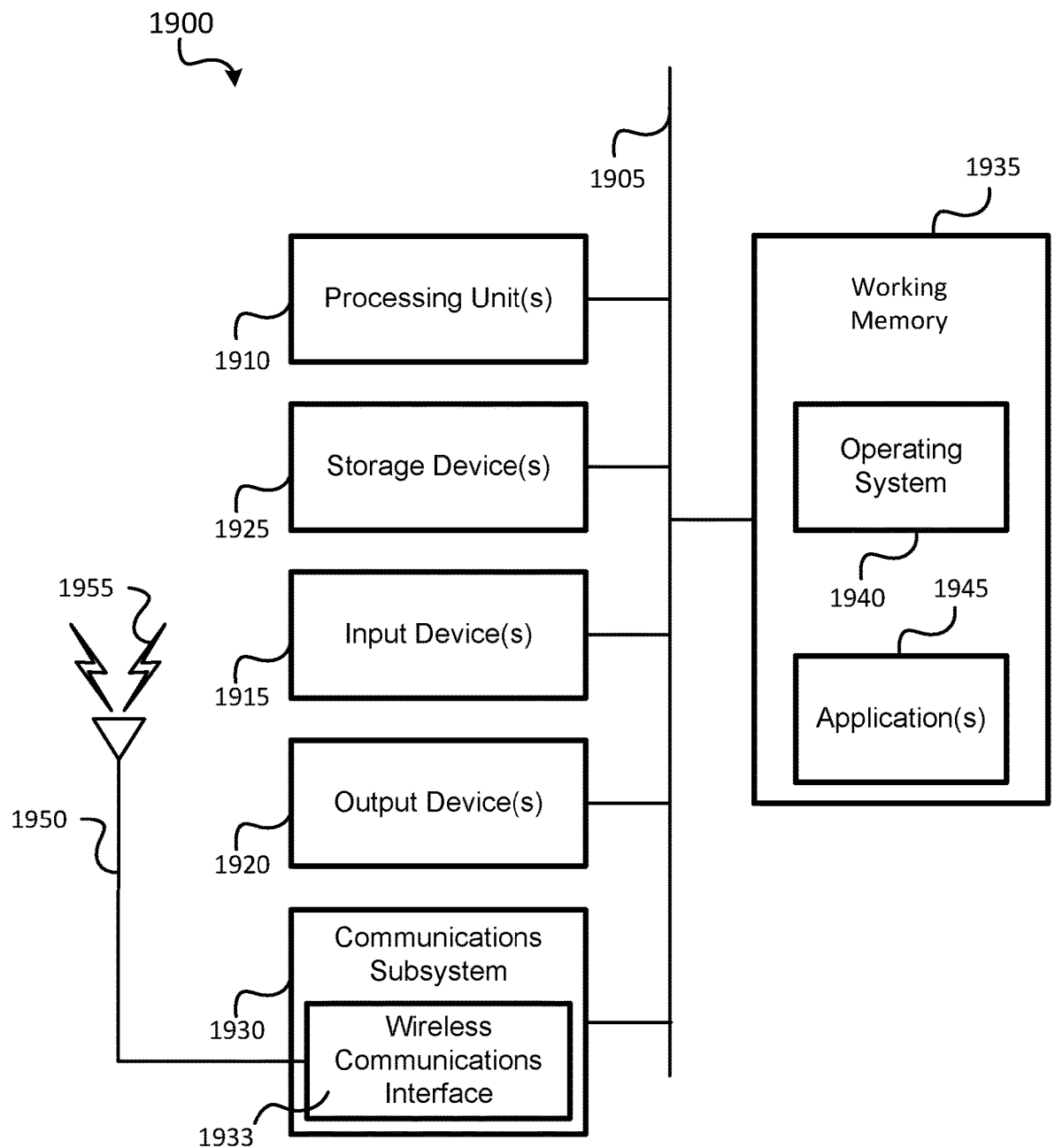
FIG. 19 is a block diagram of an example of a computer system according to certain embodiments.

FIG. 19 is a block diagram of an embodiment of a computer system 1900, which may be used, in whole or in part, to provide the functions of one or more network components as described in the embodiments herein (e.g., location server 160 of FIG. 1, LMF 220 of FIG. 2, etc.). It should be noted that FIG. 19 is meant only to provide a generalized illustration of various components, any or all of which may be utilized as appropriate. FIG. 19, therefore, broadly illustrates how individual system elements may be implemented in a relatively separated or relatively more integrated manner. In addition, it can be noted that components illustrated by FIG. 19 can be localized to a single device and/or distributed among various networked devices, which may be disposed at different geographical locations.

The computer system 1900 is shown comprising hardware elements that can be electrically coupled via a bus 1905 (or may otherwise be in communication, as appropriate). The hardware elements may include processing unit(s) 1910, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1900 also may comprise one or more input devices 1915, which may comprise without limitation a mouse, a keyboard, a camera, a microphone, and/or the like; and one or more output devices 1920, which may comprise without limitation a display device, a printer, and/or the like.

The computer system 1900 may further include (and/or be in communication with) one or more non-transitory storage devices 1925, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1900 may also include a communications subsystem 1930, which may comprise wireless communication technologies managed and controlled by a wireless communication interface 1933, as well as wired technologies (such as Ethernet, coaxial communications, universal serial bus (USB), and the like). The wireless communication interface 1933 may send and receive wireless signals 1955 (e.g., signals according to 5G NR or LTE) via wireless antenna(s) 1950. Thus the communications subsystem 1930 may comprise a modem, a network card (wireless or wired), an infrared communication device, a wireless communication device, and/or a chipset, and/or the like, which may enable the computer system 1900 to communicate on any or all of the communication networks described herein to any device on the respective network, including a User Equipment (UE), base stations and/or other TRPs, and/or any other electronic devices described herein. Hence, the communications subsystem 1930 may be used to receive and send data as described in the embodiments herein.

In many embodiments, the computer system 1900 will further comprise a working memory 1935, which may comprise a RAM or ROM device, as described above. Software elements, shown as being located within the working memory 1935, may comprise an operating system 1940, device drivers, executable libraries, and/or other code, such as one or more applications 1945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1925 described above. In some cases, the storage medium might be incorporated within a computer system, such as computer system 1900. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1900 and/or might take the form of source and/or installable code, which, upon compilation and/or installation on the computer system 1900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method, at a User Equipment (UE), of positioning the UE comprising: receiving positioning assistance data associated with a Transmission Reception Point (TRP), the positioning assistance data including an expected Reference Signal Time difference (RSTD) between a reference cell and the TRP; capturing, based on at least the expected RSTD, a first portion of reference signals from the TRP, wherein, at the UE, the first portion of the reference signals does not overlap in time with non-reference signals from the reference cell; and determining a first Time of Arrival (TOA) of the reference signals from the TRP based on the first portion of the reference signals.

Clause 2. The method of clause 1, wherein the reference signals include Long-Term Evolution (LTE) Positioning Reference Signals (PRS) or New Radio (NR) PRS signals.

Clause 3. The method of clause 2, wherein resource elements for the NR PRS signals are arranged according to a comb-symbol pattern of an Orthogonal Frequency-Division Multiplexing (OFDM) resource block.

Clause 4. The method of clause 3, wherein the resource elements for the NR PRS signals are in 1, 2, 3, 6, 9, or 12 symbols of the OFDM resource block.

Clause 5. The method of clause 3 or 4, wherein the resource elements for the NR PRS signals are arranged according to comb-1, comb-2, comb-3, comb-4, comb-6, or comb-12 pattern in the OFDM resource block.

Clause 6. The method of any of clauses 1-5, further comprising sending the first TOA to a location server.

Clause 7. The method of any of clauses 1-6, further comprising: capturing a second portion of the reference signals from the TRP, the second portion of the reference signals overlapping in time with the non-reference signals from the reference cell; determining a second TOA of the reference signals from the TRP based on the first portion of the reference signals and the second portion of the reference signals; and selecting a smaller one of the first TOA and the second TOA as an estimated TOA of the reference signals from the TRP.

Clause 8. The method of any of clauses 1-7, wherein: the positioning assistance data includes an uncertainty of the expected RSTD; the method further comprises determining, based on the expected RSTD and the uncertainty of the expected RSTD, a search window for searching the reference signals; and the first portion of the reference signals starts at a time within the search window.

Clause 9. The method of clause 8, wherein the time within the search window is a predetermined time.

Clause 10. The method of clause 8 or 9, wherein: the search window includes a plurality of symbols in a positioning subframe; and the first portion of the reference signals starts at a symbol of the plurality of symbols in the positioning subframe.

Clause 11. The method of clause 10, further comprising: for each symbol of one or more symbols in the plurality of symbols in the search window: capturing, starting from the symbol, a respective portion of the reference signals that does not overlap with the non-reference signals from the reference cell; and determining a respective TOA of the reference signals from the TRP based on the respective portion of the reference signals; and selecting, from the one or more respective TOAs for the one or more symbols, a smallest TOA as an estimated TOA of the reference signals from the TRP.

Clause 12. The method of any of clauses 1-11, wherein receiving the positioning assistance data comprises receiving the positioning assistance data from a serving next generation NodeB (gNB) or a Location Management Function (LMF) server.

Clause 13. The method of any of clauses 1-12, further comprising determining a location of the UE using a downlink Time Difference of Arrival (DL-TDOA) technique and based on at least the first TOA of the reference signals from the TRP and a location of the TRP.

Clause 14. A device comprising: a transceiver; a memory; and one or more processors communicatively coupled with the transceiver and the memory and configured to: receive, via the transceiver, positioning assistance data associated with a Transmission Reception Point (TRP), the positioning assistance data including an expected Reference Signal Time difference (RSTD) between a reference cell and the TRP; capture, via the transceiver and based on at least the expected RSTD, a first portion of reference signals from the TRP, wherein, at the device, the first portion of the reference signals does not overlap in time with non-reference signals from the reference cell; and determine a first Time of Arrival (TOA) of the reference signals from the TRP based on the first portion of the reference signals.

Clause 15. The device of clause 14, wherein the reference signals include Long-Term Evolution (LTE) Positioning Reference Signals (PRS) or New Radio (NR) PRS signals.

Clause 16. The device of clause 14 or 15, wherein the one or more processors are configured to send, via the transceiver, the first TOA to a location server.

Clause 17. The device of any of clauses 14-16, wherein the one or more processors are configured to: capture, via the transceiver, a second portion of the reference signals from the TRP, the second portion of the reference signals overlapping in time with the non-reference signals from the reference cell; determine a second TOA of the reference signals from the TRP based on the first portion of the reference signals and the second portion of the reference signals; and select a smaller one of the first TOA and the second TOA as an estimated TOA of the reference signals from the TRP.

Clause 18. The device of any of clauses 14-17, wherein: the positioning assistance data includes an uncertainty of the expected RSTD; the one or more processors are configured to determine, based on the expected RSTD and the uncertainty of the expected RSTD, a search window for searching the reference signals; and the first portion of the reference signals starts at a time within the search window.

Clause 19. The device of clause 18, wherein the time within the search window is a predetermined time.

Clause 20. The device of clause 18 or 19, wherein: the search window includes a plurality of symbols in a positioning subframe; and the first portion of the reference signals starts at a symbol of the plurality of symbols in the positioning subframe.

Clause 21. The device of clause 20, wherein the one or more processors are configured to: for each symbol of one or more symbols in the plurality of symbols in the search window: capture, via the transceiver, starting from the symbol, a respective portion of the reference signals that does not overlap with the non-reference signals from the reference cell; and determine a respective TOA of the reference signals from the TRP based on the respective portion of the reference signals; and select, from the one or more respective TOAs for the one or more symbols, a smallest TOA as an estimated TOA of the reference signals from the TRP.

Clause 22. The device of any of clauses 14-21, wherein the one or more processors are configured to receive the positioning assistance data from a serving next generation NodeB (gNB) or a Location Management Function (LMF) server.

Clause 23. A device comprising: means for receiving positioning assistance data associated with a Transmission Reception Point (TRP), the positioning assistance data including an expected Reference Signal Time difference (RSTD) between a reference cell and the TRP; means for capturing, based on at least the expected RSTD, a first portion of reference signals from the TRP, wherein, at the device, the first portion of the reference signals does not overlap in time with non-reference signals from the reference cell; and means for determining a first Time of Arrival (TOA) of the reference signals from the TRP based on the first portion of the reference signals.

Clause 24. The device of clause 23, wherein the reference signals include Long-Term Evolution (LTE) Positioning Reference Signals (PRS) or New Radio (NR) PRS signals.

Clause 25. The device of clause 23 or 24, further comprising: means for capturing a second portion of the reference signals from the TRP, the second portion of the reference signals overlapping in time with the non-reference signals from the reference cell; means for determining a second TOA of the reference signals from the TRP based on the first portion of the reference signals and the second portion of the reference signals; and means for selecting a smaller one of the first TOA and the second TOA as an estimated TOA of the reference signals from the TRP.

Clause 26. The device of any of clauses 23-25, wherein: the positioning assistance data includes an uncertainty of the expected RSTD; the device further comprises means for determining, based on the expected RSTD and the uncertainty of the expected RSTD, a search window for searching the reference signals; and the first portion of the reference signals starts at a time within the search window.

Clause 27. A non-transitory computer-readable medium having instructions stored thereon, the instructions, when executed by one or more processing units, causing the one or more processing units to perform functions comprising: receiving positioning assistance data associated with a Transmission Reception Point (TRP), the positioning assistance data including an expected Reference Signal Time difference (RSTD) between a reference cell and the TRP; capturing, based on at least the expected RSTD, a first portion of reference signals from the TRP, wherein the first portion of the reference signals does not overlap in time with non-reference signals from the reference cell; and determining a first Time of Arrival (TOA) of the reference signals from the TRP based on the first portion of the reference signals.

Clause 28. The non-transitory computer-readable medium of clause 27, wherein the reference signals include Long-Term Evolution (LTE) Positioning Reference Signals (PRS) or New Radio (NR) PRS signals.

Clause 29. The non-transitory computer-readable medium of clause 27 or 28, wherein the functions further comprise: capturing a second portion of the reference signals from the TRP, the second portion of the reference signals overlapping in time with the non-reference signals from the reference cell; determining a second TOA of the reference signals from the TRP based on the first portion of the reference signals and the second portion of the reference signals; and selecting a smaller one of the first TOA and the second TOA as an estimated TOA of the reference signals from the TRP.

Clause 30. The non-transitory computer-readable medium of any of clauses 27-29, wherein: the positioning assistance data includes an uncertainty of the expected RSTD; the functions further comprise determining, based on the expected RSTD and the uncertainty of the expected RSTD, a search window for searching the reference signals; and the first portion of the reference signals starts at a time within the search window.

What is claimed is:

1. A method, at a User Equipment (UE), of positioning the UE comprising:
   receiving positioning assistance data associated with a Transmission Reception Point (TRP), the positioning assistance data including an expected Reference Signal Time difference (RSTD) between a reference cell and the TRP;
   capturing, based on at least the expected RSTD, a first portion of reference signals from the TRP, wherein, at the UE, the first portion of the reference signals does not overlap in time with non-reference signals from the reference cell; and
   determining a first Time of Arrival (TOA) of the reference signals from the TRP based on the first portion of the reference signals.

2. The method of claim 1, wherein the reference signals include Long-Term Evolution (LTE) Positioning Reference Signals (PRS) or New Radio (NR) PRS signals.

3. The method of claim 2, wherein resource elements for the NR PRS signals are arranged according to a comb-symbol pattern of an Orthogonal Frequency-Division Multiplexing (OFDM) resource block.

4. The method of claim 3, wherein the resource elements for the NR PRS signals are in 1, 2, 3, 6, 9, or 12 symbols of the OFDM resource block.

5. The method of claim 3, wherein the resource elements for the NR PRS signals are arranged according to comb-1, comb-2, comb-3, comb-4, comb-6, or comb-12 pattern in the OFDM resource block.

6. The method of claim 1, further comprising sending the first TOA to a location server.

7. The method of claim 1, further comprising:
capturing a second portion of the reference signals from the TRP, the second portion of the reference signals overlapping in time with the non-reference signals from the reference cell;
determining a second TOA of the reference signals from the TRP based on the first portion of the reference signals and the second portion of the reference signals; and
selecting a smaller one of the first TOA and the second TOA as an estimated TOA of the reference signals from the TRP.

8. The method of claim 1, wherein:
the positioning assistance data includes an uncertainty of the expected RSTD;
the method further comprises determining, based on the expected RSTD and the uncertainty of the expected RSTD, a search window for searching the reference signals; and
the first portion of the reference signals starts at a time within the search window.

9. The method of claim 8, wherein the time within the search window is a predetermined time.

10. The method of claim 8, wherein:
the search window includes a plurality of symbols in a positioning subframe; and
the first portion of the reference signals starts at a symbol of the plurality of symbols in the positioning subframe.

11. The method of claim 10, further comprising:
for each symbol of one or more symbols in the plurality of symbols in the search window:
capturing, starting from the symbol, a respective portion of the reference signals that does not overlap with the non-reference signals from the reference cell; and
determining a respective TOA of the reference signals from the TRP based on the respective portion of the reference signals; and
selecting, from the one or more respective TOAs for the one or more symbols, a smallest TOA as an estimated TOA of the reference signals from the TRP.

12. The method of claim 1, wherein receiving the positioning assistance data comprises receiving the positioning assistance data from a serving next generation NodeB (gNB) or a Location Management Function (LMF) server.

13. The method of claim 1, further comprising determining a location of the UE using a downlink Time Difference of Arrival (DL-TDOA) technique and based on at least the first TOA of the reference signals from the TRP and a location of the TRP.

14. A device comprising:
a transceiver;
a memory; and
one or more processors communicatively coupled with the transceiver and the memory and configured to:
receive, via the transceiver, positioning assistance data associated with a Transmission Reception Point (TRP), the positioning assistance data including an expected Reference Signal Time difference (RSTD) between a reference cell and the TRP;
capture, via the transceiver and based on at least the expected RSTD, a first portion of reference signals from the TRP, wherein, at the device, the first portion of the reference signals does not overlap in time with non-reference signals from the reference cell; and
determine a first Time of Arrival (TOA) of the reference signals from the TRP based on the first portion of the reference signals.

15. The device of claim 14, wherein the reference signals include Long-Term Evolution (LTE) Positioning Reference Signals (PRS) or New Radio (NR) PRS signals.

16. The device of claim 14, wherein the one or more processors are configured to send, via the transceiver, the first TOA to a location server.

17. The device of claim 14, wherein the one or more processors are configured to:
capture, via the transceiver, a second portion of the reference signals from the TRP, the second portion of the reference signals overlapping in time with the non-reference signals from the reference cell;
determine a second TOA of the reference signals from the TRP based on the first portion of the reference signals and the second portion of the reference signals; and
select a smaller one of the first TOA and the second TOA as an estimated TOA of the reference signals from the TRP.

18. The device of claim 14, wherein:
the positioning assistance data includes an uncertainty of the expected RSTD;
the one or more processors are configured to determine, based on the expected RSTD and the uncertainty of the expected RSTD, a search window for searching the reference signals; and
the first portion of the reference signals starts at a time within the search window.

19. The device of claim 18, wherein the time within the search window is a predetermined time.

20. The device of claim 18, wherein:
the search window includes a plurality of symbols in a positioning subframe; and
the first portion of the reference signals starts at a symbol of the plurality of symbols in the positioning subframe.

21. The device of claim 20, wherein the one or more processors are configured to:
for each symbol of one or more symbols in the plurality of symbols in the search window:
capture, via the transceiver, starting from the symbol, a respective portion of the reference signals that does not overlap with the non-reference signals from the reference cell; and
determine a respective TOA of the reference signals from the TRP based on the respective portion of the reference signals; and
select, from the one or more respective TOAs for the one or more symbols, a smallest TOA as an estimated TOA of the reference signals from the TRP.

22. The device of claim 14, wherein the one or more processors are configured to receive the positioning assistance data from a serving next generation NodeB (gNB) or a Location Management Function (LMF) server.

23. A device comprising:
means for receiving positioning assistance data associated with a Transmission Reception Point (TRP), the positioning assistance data including an expected Reference Signal Time difference (RSTD) between a reference cell and the TRP;
means for capturing, based on at least the expected RSTD, a first portion of reference signals from the TRP, wherein, at the device, the first portion of the reference signals does not overlap in time with non-reference signals from the reference cell; and means for determining a first Time of Arrival (TOA) of the reference signals from the TRP based on the first portion of the reference signals.

24. The device of claim 23, wherein the reference signals include Long-Term Evolution (LTE) Positioning Reference Signals (PRS) or New Radio (NR) PRS signals.

25. The device of claim 23, further comprising:
means for capturing a second portion of the reference signals from the TRP, the second portion of the reference signals overlapping in time with the non-reference signals from the reference cell;
means for determining a second TOA of the reference signals from the TRP based on the first portion of the reference signals and the second portion of the reference signals; and
means for selecting a smaller one of the first TOA and the second TOA as an estimated TOA of the reference signals from the TRP.

26. The device of claim 23, wherein:
the positioning assistance data includes an uncertainty of the expected RSTD;
the device further comprises means for determining, based on the expected RSTD and the uncertainty of the expected RSTD, a search window for searching the reference signals; and
the first portion of the reference signals starts at a time within the search window.

27. A non-transitory computer-readable medium having instructions stored thereon, the instructions, when executed by one or more processing units, causing the one or more processing units to perform functions comprising:
receiving positioning assistance data associated with a Transmission Reception Point (TRP), the positioning assistance data including an expected Reference Signal Time difference (RSTD) between a reference cell and the TRP;
capturing, based on at least the expected RSTD, a first portion of reference signals from the TRP, wherein the first portion of the reference signals does not overlap in time with non-reference signals from the reference cell; and
determining a first Time of Arrival (TOA) of the reference signals from the TRP based on the first portion of the reference signals.

28. The non-transitory computer-readable medium of claim 27, wherein the reference signals include Long-Term Evolution (LTE) Positioning Reference Signals (PRS) or New Radio (NR) PRS signals.

29. The non-transitory computer-readable medium of claim 27, wherein the functions further comprise:
capturing a second portion of the reference signals from the TRP, the second portion of the reference signals overlapping in time with the non-reference signals from the reference cell;
determining a second TOA of the reference signals from the TRP based on the first portion of the reference signals and the second portion of the reference signals; and
selecting a smaller one of the first TOA and the second TOA as an estimated TOA of the reference signals from the TRP.

30. The non-transitory computer-readable medium of claim 27, wherein:
the positioning assistance data includes an uncertainty of the expected RSTD;
the functions further comprise determining, based on the expected RSTD and the uncertainty of the expected RSTD, a search window for searching the reference signals; and
the first portion of the reference signals starts at a time within the search window.

\* \* \* \* \*